United States Patent
Yoshida et al.

(10) Patent No.: US 8,072,548 B2
(45) Date of Patent: Dec. 6, 2011

(54) OUTPUT CONTROL APPARATUS CONTROLLING AN OUTPUT OF VIDEO OR AUDIO BY AUTOMATICALLY SWITCHING AN INPUT OF A REPRODUCTION DEVICE AND AN OUTPUT CONTROL SYSTEM, A REPRODUCTION APPARATUS AND A TELEVISION FOR PERFORMING THE SAME

(75) Inventors: Junji Yoshida, Osaka (JP); Masazumi Yamada, Osaka (JP); Hiroshi Kase, Osaka (JP)

(73) Assignee: Panasonic Corporation, Osaka (JP)

( * ) Notice: Subject to any disclaimer, the term of this patent is extended or adjusted under 35 U.S.C. 154(b) by 1318 days.

(21) Appl. No.: 11/661,500

(22) PCT Filed: Jul. 11, 2006

(86) PCT No.: PCT/JP2006/013782
§ 371 (c)(1),
(2), (4) Date: Feb. 27, 2007

(87) PCT Pub. No.: WO2007/013297
PCT Pub. Date: Feb. 1, 2007

(65) Prior Publication Data
US 2008/0007659 A1    Jan. 10, 2008

(30) Foreign Application Priority Data
Jul. 25, 2005    (JP) ................................. 2005-215004

(51) Int. Cl.
*H04N 5/268* (2006.01)
*H04N 5/783* (2006.01)
*H04N 5/775* (2006.01)

(52) U.S. Cl. ......................... 348/706; 386/230; 386/231

(58) Field of Classification Search .................. 348/706, 348/734, 552, 569; 386/230, 231; 710/11, 710/14, 15, 18; 463/40, 42
See application file for complete search history.

(56) References Cited

U.S. PATENT DOCUMENTS

| | | | |
|---|---|---|---|
| 5,754,731 A | 5/1998 | Komedashi et al. | |
| 6,134,377 A | 10/2000 | Komedashi et al. | |
| 6,289,169 B1 * | 9/2001 | Okuyama | 386/231 |
| 7,907,118 B2 * | 3/2011 | Matsui et al. | 345/156 |

(Continued)

FOREIGN PATENT DOCUMENTS

GB    2 286 917    8/1995

(Continued)

OTHER PUBLICATIONS

High-Definition Multimedia Interface Specification Version 1.1, "CEC 13.1 One Touch Play", "CEC 13.12 Routing Control", May 20, 2004.

*Primary Examiner* — Victor Kostak
(74) *Attorney, Agent, or Firm* — Wenderoth, Lind & Ponack, L.L.P.

(57) ABSTRACT

An output control apparatus capable of appropriately switching screens depending on a current situation, and a reproduction apparatus and a television performing the same. The television includes a tuner receiving a television broadcast, a data input I/F receiving video or audio from a DVD recorder, and a command input I/F receiving a command from the DVD recorder. Further, the television includes a user input unit receiving an instruction from a user, a switch selecting the tuner or the data input I/F, an output processing unit controlling an output of video or audio from the switch, and a control unit (i) switching the switch to the tuner when the switch selects the data input I/F when a first command is inputted from the command input I/F and (ii) not switching the switch when the switch does not select the data input I/F.

21 Claims, 21 Drawing Sheets

U.S. PATENT DOCUMENTS

| | | | |
|---|---|---|---|
| 2001/0023498 A1* | 9/2001 | Cosmao et al. | 725/32 |
| 2002/0032907 A1* | 3/2002 | Daniels | 725/51 |
| 2002/0149704 A1* | 10/2002 | Kano et al. | 348/706 |
| 2005/0053366 A1* | 3/2005 | Adachi | 386/126 |
| 2005/0152664 A1* | 7/2005 | Kaminosono | 386/1 |
| 2005/0259975 A1* | 11/2005 | Naitoh | 386/124 |
| 2005/0262541 A1 | 11/2005 | Oota | |
| 2006/0098947 A1* | 5/2006 | Kim et al. | 386/98 |
| 2007/0274684 A1* | 11/2007 | Yoshida et al. | 386/96 |

FOREIGN PATENT DOCUMENTS

| | | |
|---|---|---|
| JP | 7-007679 | 1/1995 |
| JP | 7-240882 | 9/1995 |
| JP | 10-294902 | 11/1998 |
| JP | 2000-175112 | 6/2000 |
| JP | 2000-350131 | 12/2000 |
| JP | 2002-354531 | 12/2002 |
| JP | 2003-110951 | 4/2003 |
| JP | 2003-289480 | 10/2003 |
| JP | 2004-048706 | 2/2004 |
| JP | 2004-328383 | 11/2004 |
| JP | 2004-364227 | 12/2004 |
| JP | 2005-073127 | 3/2005 |
| JP | 2005-102002 | 4/2005 |
| JP | 2005-109742 | 4/2005 |
| WO | 2004/110065 | 12/2004 |

* cited by examiner

FIG. 14

| Screen at the time of receiving "start output" command | Former screen information |
|---|---|
| Screen of TV broadcast | "TV broadcast" |
| Screen of DVD recorder 101 | "DVR1" |
| Screen of home-use game machine 151 | "Game" |
| Unknown (Manual switching occurred in the middle) | "None" (=Reset state) |

FIG. 19

| Screen at the time of receiving "start output" command | Former screen information |
|---|---|
| Screen of TV broadcast | "TV:TV broadcast" |
| TV menu screen (Device for viewing selection screen) | "TV:Device for viewing selection screen" |
| Screen of DVD recorder 101 | "DVR1" |
| Screen of home-use game machine 151 | "Game" |
| Unknown (Manual switching occurred in the middle) | "None" (=Reset state) |

OUTPUT CONTROL APPARATUS CONTROLLING AN OUTPUT OF VIDEO OR AUDIO BY AUTOMATICALLY SWITCHING AN INPUT OF A REPRODUCTION DEVICE AND AN OUTPUT CONTROL SYSTEM, A REPRODUCTION APPARATUS AND A TELEVISION FOR PERFORMING THE SAME

TECHNICAL FIELD

The present invention relates to an output control apparatus that controls the output of video or audio, and particularly to technology for automatically switching the input of a television.

BACKGROUND ART

Nowadays, the use of televisions is not limited to the reception and viewing of television broadcasts, and they are used for a variety of purposes. For example, by connecting a digital video recorder (DVR) such as a video tape recorder (VTR) and a DVD recorder to a television, it is possible to view contents reproduced by these external devices, and by connecting a home-use game machine, it is possible to enjoy playing games. For this reason, many televisions are equipped with one or more external input terminals, in addition to an antenna terminal for receiving television broadcasts. A user can switch between these input terminals by operating buttons on a remote control or the television body.

Televisions equipped with a number of external input terminals (many of which are high-end televisions) have an advantage of being able to simultaneously connect to a number of external devices such as a DVR and a home-use game machine. On the other hand, there is a drawback in that operations become complicated since it is necessary to manually switch inputs.

Meanwhile, many recent VTRs and DVRs include a tuner, and thus are capable of receiving television broadcasts. When contents reproduction is not carried out in such a VTR and a DVR, it is common that a television broadcast received by the tuner is outputted to the television.

As thus described, it is possible to view a television broadcast even when the input of the television is set to the VTR. However, in the case where the recording of an analog terrestrial television broadcast is carried out, for example, when the input of the television is set to the VTR, it is not possible to view an analog terrestrial television broadcast of another channel. In other words, in order to view a television broadcast of a desired channel, it is easier to use the tuner of the television than using the tuner of the VTR or DVR. In view of this, there exists technology for automatically switching the input of the television by transmitting a command between the television and an external device.

For example, a reproduction device disclosed in Japanese Laid-Open Patent Application No. 2000-350131 sends an instruction signal to a television when the reproduction device starts reproduction. This instruction signal is a signal for switching the input of the television to an output terminal of the television to which the output terminal of the reproduction device is connected. Furthermore, when entering a power-off state, this reproduction device sends, to the television, a signal to instruct that the input of the television should be switched to the antenna or tuner. This makes it possible to display the reproduced video onto the screen of the television, when the reproduction device starts reproduction, and to display the video received by the antenna or tuner of the television onto the screen of the television, when the reproduction device enters a power-off state.

Note that the AV.link standard (CENELECAV.link (EN50157-1, EN50157-2-1, EN50157-2-2, EN50157-2-3)) specifies commands to allow the interoperability between a television, a VTR, and the like. According to this standard, the VTR issues a predetermined command to the television, when the VTR starts reproduction or when the VTR displays a menu screen. This makes it possible to cause the television to transit from the stand-by state to a state in which the television can display a screen of the VTR.

DISCLOSURE OF INVENTION

Problems that Invention is to Solve

However, according to the reproduction device disclosed by Japanese Laid-Open Patent Application No. 2000-350131 mentioned above, the input of the television is switched to the antenna or tuner without considering the state of the television. This may lead to the problem of confusing the user and thus adversely resulting in poor usability.

For example, according to the reproduction device disclosed by Japanese Laid-Open Patent Application No. 2000-350131 mentioned above, even in the case where the screen of another external device such as a home-use game machine has been displayed on the television, the screen of the television switches to that of a television broadcast when the reproduction device enters a power-off state.

The present invention has been conceived in view of the above problems, and it is an object of the present invention to provide an output control apparatus capable of appropriately switching screens depending on the situation.

Means to Solve the Problems

In order to achieve the above object, the output control apparatus according to the present invention is an output control apparatus that controls output of video or audio, the apparatus including: a tuner that receives a television broadcast; a data input unit that receives video or audio from a reproduction apparatus; a command input unit that receives a command from the reproduction apparatus; a user input unit that receives an instruction from a user; a switch that selects the tuner or the data input unit; an output control unit that controls output of video or audio from the switch; and a switching control unit that: controls the switch based on the instruction from the command input unit or the user input unit; and controls the switch to select the tuner when the switch is set to the data input unit and controls the switch to not select the tuner when the switch is not set to the data input unit upon receiving a first command inputted from the command input unit, the first command indicating that the reproduction apparatus has entered a predetermined state. With this structure, since the switch switches to the tuner in the case where the switch is selecting the data input unit when the first command is inputted from the command input unit, it is possible to switch the screen to that of the television broadcast received by the tuner. Meanwhile, since the screen will not be switched in the case where the switch is not selecting the data input unit, it is possible to prevent the user from being confused.

Here, the output control apparatus may further include: a flag storage unit that stores a flag having a plurality of values; and a flag setting unit that sets the flag to one of the plurality of values, wherein the flag setting unit may: set the value of the flag to a first value when the switch is set to the tuner and set the value of the flag to a second value when the switch is set to an element other than the tuner upon receiving a second command indicating that the reproduction apparatus has entered a predetermined state is inputted from the command input unit; and set the value of the flag to the second value when the switch is set to an element other than the data input unit based on the instruction from the user input unit, and the switching control unit may control the switch to select the tuner when the value of the flag is the first value upon receiving the first command inputted from the command input unit, and may control the switch to select the tuner when the value of the flag is the second value upon receiving the first command inputted from the command input unit. With this structure, since the switch switches to the tuner in the case where the value of the flag is the first value when the first command is inputted from the command input unit, it is possible to switch the screen to that of the television broadcast received by the tuner. Meanwhile, since the screen will not be switched in the case where the value of the flag is the second value, it is possible to prevent the user from being confused.

Furthermore, the output control apparatus may further include: a former screen information storage unit that stores former screen information that includes information indicating a screen source from which a screen has been supplied; and a former screen information setting unit that sets the former screen information, wherein the former screen information setting unit may: set, as the former screen information, a value indicating a screen source from which a screen outputted from the switch has been supplied, the screen being outputted from the switch when the second command is inputted from the command input unit; and reset the former screen information when the switch is set to an element other than the data input unit based on the instruction from the user input unit, and the switching control unit may control the switch to select the screen source indicated by the former screen information when the former screen information is not in a reset state upon receiving the first command inputted from the command input unit, and may not control the switch when the former screen information is in the reset state upon receiving the first command inputted from the command input unit. With this structure, since the switch switches to the screen source indicated by the former screen information in the case where the former screen information is not in a reset state when the first command is inputted from the command input unit, it is possible to switch the screen to that of the television broadcast received by the tuner. Meanwhile, since the screen will not be switched in the case where the former screen information is in the reset state, it is possible to prevent the user from being confused.

Moreover, the output control apparatus may further include: a former screen information storage unit that stores former screen information including a value indicating a screen source from which a screen has been supplied and a value indicating a type of a utility screen; and a former screen information setting unit that sets the former screen information, wherein the former screen information setting unit may: set, as the former screen information, (i) the value indicating the screen source from which a screen outputted from the switch has been supplied, the screen being outputted from the switch when the second command is inputted from the command input unit, and (ii) the value indicating the type of utility screen being outputted by the output control unit; and reset the former screen information when the switch is set to an element other than the data input unit based on the instruction from the user input unit, the switching control unit may control the switch to select the screen source indicated by the former screen information when the former screen information is not in a reset state upon receiving the first command inputted from the command input unit, and may not control the switch when the former screen information is in the reset state upon receiving the first command inputted from the command input unit, and the output control unit may cause the utility screen indicated by the former screen information to be outputted when the switch is set to the screen source indicated by the former screen information. With this structure, the screen switches to the screen indicated by the former screen information and the utility screen indicated by the former screen information is outputted, in the case where the former screen information is not in a reset state when the first command is inputted from the command input unit. Meanwhile, since the screen will not be switched in the case where the former screen information is in a reset state, it is possible to prevent the user from being confused.

The output control apparatus may comprise a plurality of the data input units, and the switch may select one of the tuner or one of the plurality of the data input units. With this structure, it is possible to apply the present invention to an output control apparatus equipped with a number of external input terminals.

Furthermore, the switching control unit may control the switch to select the data input unit when a second command is inputted from the command input unit. With this structure, it is possible to output, on to the screen, the video or audio from the reproduction apparatus, when the second command is inputted from the command input unit.

Furthermore, the output control apparatus according to the present invention is a reproduction apparatus that reproduces video or audio, the apparatus including: a reproduction unit that reproduces video or audio recorded in a recording medium; a data output unit that outputs the reproduced video or audio to an output control apparatus; and a command output unit that outputs a first command to the output control apparatus when the output of the reproduced video or audio ends. With this structure, it is possible to output the first command to the output control apparatus, when the output of the reproduced video or audio ends.

Here, the reproduction apparatus may further include a screen creation unit that crates a utility screen, wherein the data output unit may output the created utility screen to the output control apparatus, and the command output unit may output the first command to the output control apparatus when the output of the created utility screen ends. With this structure, it is possible to output the utility screen to the output control apparatus, in addition to the video or audio recorded on the recording medium.

Moreover, the first command may be a command indicating that predetermined data is being outputted to the output control apparatus. With this structure, it is possible to recognize, on the output control apparatus side, that there exists no data to be outputted from the reproduction apparatus.

The reproduction apparatus may further include a tuner that receives a television broadcast, wherein the first command may be a command indicating that the received television broadcast is being outputted to the output control apparatus. With this structure, it is possible to recognize, on the output control apparatus side, that the television broadcast received by the tuner in the reproduction apparatus is being outputted from the reproduction apparatus.

The reproduction apparatus may further include: a conversion unit that converts a received television broadcast into video or audio in a predetermined format; and a recording unit that records the video or audio obtained through the conversion into the recording medium. In other words, it is possible to apply the present invention not only to a reproduction apparatus such as a DVD player, but also to a reproduction/recording apparatus such as a DVD recorder.

Furthermore, the command output unit may output a second command to the output control apparatus when the output of the reproduced video or audio starts or when the output of the created utility screen starts. With this structure, it is possible to recognize, on the output control apparatus side, that the output of the reproduced video or the like from the reproduction apparatus has started.

Effects of the Invention

As is obvious from the above description, according to the output control apparatus of the present invention, since the switch switches to the tuner in the case where the switch is selecting the data input unit that receives video or audio from the reproduction apparatus, when the first command is inputted from the command input unit that receives a command from the reproduction apparatus, it is possible to switch the screen to that of the television broadcast received by the tuner. Meanwhile, since the screen will not be switched in the case where the switch is not selecting the data input unit, it is possible to prevent the user from being confused.

BRIEF DESCRIPTION OF DRAWINGS

FIG. 14 is a diagram which shows an example of former screen information in the third embodiment.

FIG. 19 is a diagram which shows an example of former screen information in a fourth embodiment.

NUMERICAL REFERENCES

Figure 1:
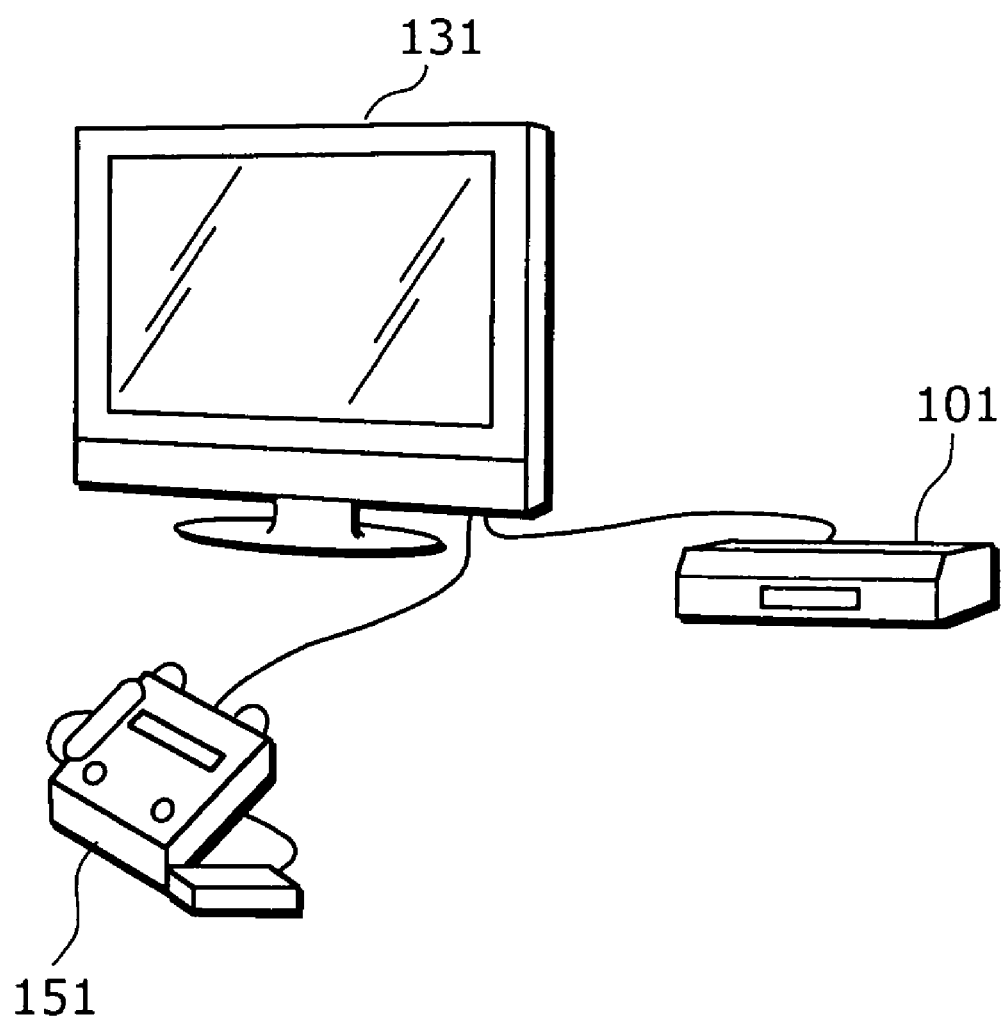
FIG. 1 is a diagram which shows an overview of a first embodiment.

101 DVD recorder
102 Control unit
103 Tuner
104 Disc management unit
105 Encoder
106 Decoder
107 User input unit
108 Switch
109 Data output I/F
110 Command output I/F
111 DVD-RAM disc
112 Output processing unit
121 Antenna
122 Data cable
123 Command cable
131 Television
132 Screen
133 Speaker
134 Control unit
135 Output processing unit
136 Tuner
137 Switch
138 User input unit
139 Data input I/F
140 Command input I/F
141 Data input I/F
151 Home-use game machine
601 Television
611 Control unit
612 Flag storage unit
901 Television
911 Control unit
912 Former screen information storage unit

BEST MODE FOR CARRYING OUT THE INVENTION

Hereafter, embodiments of the present invention will be described in detail with reference to the drawings.

First Embodiment

FIG. 1 is a diagram which shows an overview of the first embodiment. Here, a state in which the DVD recorder 101 and the home-use game machine 151 are connected to the television 131 is shown. The television 131 is one example of the output control apparatus of the present invention, and the DVD recorder 101 is one example of the reproduction apparatus of the present invention.

Figure 2:
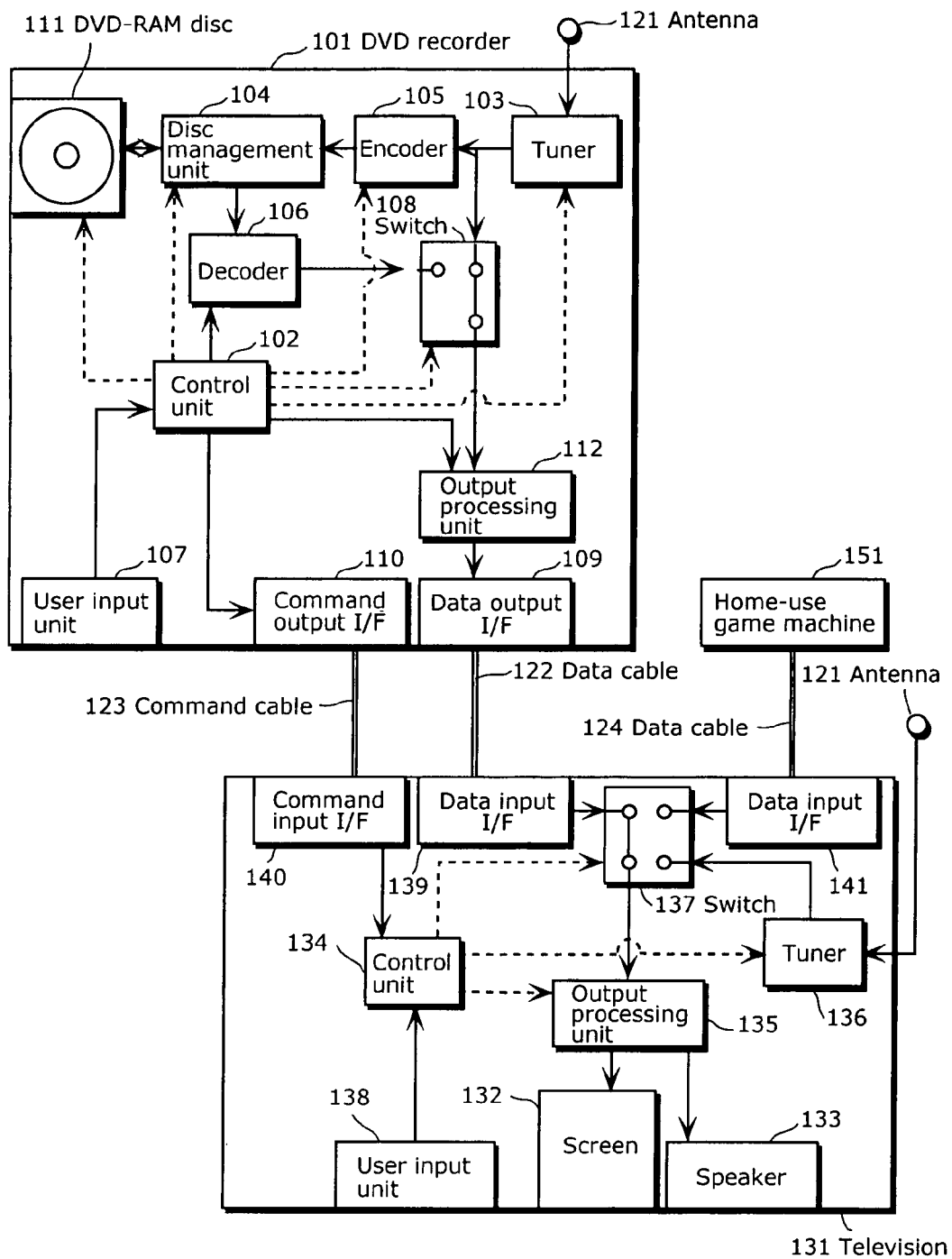
FIG. 2 is a diagram which shows example structures of a television and a DVD recorder in the first embodiment.

FIG. 2 is a diagram which shows example structures of the television 131 and the DVD recorder 101.

The DVD recorder 101 includes a control unit 102, a tuner 103, a disc management unit 104, an encoder 105, a decoder 106, a user input unit 107, a switch 108, a data output I/F 109, a command output I/F 110, a DVD-RAM disc 111, an output processing unit 112, an antenna 121, a data cable 122, and a command cable 123. The control unit 102 controls an operation of each component of the DVD recorder 101. The tuner 103 extracts video/audio data of a specified channel from a television broadcast received by the antenna 121. The disc management unit 104 writes and reads data to and from the DVD disc 111. The encoder 105 converts the video/audio data received from the tuner 103 into a format suitable for the recording into the DVD-RAM disc 111. The decoder 106 decodes the data recorded in the DVD-RAM disc 111. The user input unit 107 is an operation button on the body of the DVD recorder 101, and a photo detector or the like which receives an instruction signal, such as an infrared signal, from the remote control operated by the user. The switch 108 selects one of the tuner 103 and the decoder 106. The data output I/F 109 outputs the video/audio data to the television 131 through the data cable 122. The command output I/F 110 outputs a command to the television 131 through the command cable 123. The DVD-RAM disc 111 is one example of the recording medium. The output processing unit 112 processes the video/audio data, if necessary, and outputs the resultant data to the data output I/F 109. The antenna 121 receives a television broadcast. The data cable 122 is a D terminal cable, an S terminal cable, an RCA cable, a DVI cable, or the like for transmitting the video/audio data. The command cable 123 is an RS232C serial cable or the like for transmitting a command.

The television 131 includes a screen 132, a speaker 133, a control unit 134, an output processing unit 135, a tuner 136, a switch 137, a user input unit 138, a data input I/F 139, a command input I/F 140, and a data input I/F 141. The screen 132 outputs video. The speaker 133 outputs audio. The control unit 134 controls an operation of each component of the television 131. The output processing unit 135 processes the video/audio data, if necessary, and outputs the resultant data to the screen 132 or the speaker 133. The tuner 136 extracts the video/audio data of a specified channel from the television broadcast received by the antenna 121. The switch 137 selects one of the data input I/F 139, the data input I/F 141, and the tuner 136. The user input unit 138 is an operation button on the body of the television 131, and a photo detector or the like which receives an instruction signal, such as an infrared signal, from the remote control operated by the user. The data input I/F 139 receives the video/audio data from the DVD recorder 101 through the data cable 122. The command input I/F 140 receives a command from the DVD recorder 101 through the command cable 123. The data input I/F 141 receives the video/audio data from the home-use game machine 151 through the data cable 124.

Note that a detailed description will not be given of the structure of the home-use game machine 151.

(1) Operation of DVD Recorder 101

First, an operation of the DVD recorder 101 is described.

The user can input, to the user input unit 107, various instructions such as "start reproduction", "stop reproduction", "display menu", "close menu", and so forth. Upon receiving an instruction from the user, the user input unit 107 outputs such instruction to the control unit 102. The control unit 102 controls an operation of each component of the DVD recorder 101 in accordance with the details of the instruction from the user input unit 107.

<Operation when Neither Recording Nor Reproduction is Carried Out>

The tuner 103 extracts the video/audio data of a specified channel from the television broadcast received by the antenna 121, and outputs it to the encoder 105 and the switch 108. The switch 108 outputs the video/audio data received from the tuner 103 to the output processing unit 112. The output processing unit 112 outputs the video/audio data received from the switch 108 to the data output I/F 109. When this is done, there is the case where the output processing unit 112 processes the video/audio data in accordance with an instruction from the control unit 102, to, for example, additionally display a reception channel number. The data output I/F 109 outputs the video/audio data received from the output processing unit 112 to the television 131 through the data cable 122.

When switching channels, the user provides an instruction to select a channel to the user input unit 107. Upon receiving the instruction to select the channel from the user input unit 107, the control unit 102 indicates such channel to the tuner 103. The tuner 103 outputs, to the switch 108, the video/audio data of the channel indicated by the control unit 102. Note that a screen onto which the video/audio data received by the tuner is directly outputted, is hereinafter referred to as an EE screen.

<Menu Screen Display Operation>

The menu screen here refers to: a screen on which setting of the DVD recorder 101 is performed; a program list such as an EPG; a screen on which the contents recorded on the DVD-RAM disc 111 are listed; and the like.

Upon receiving a "display menu" instruction from the user input unit 107, the control unit 102 instructs the output processing unit 112 to create and output a menu screen. The output processing unit 112 creates data for the menu screen instructed by the control unit 102, and outputs the resulting data for the menu screen to the data output I/F 109 in replacement of the video/audio data received from the switch 108. When this is done, there is the case where the output processing unit 112 incorporates the video/audio data received from the switch 108 into the menu screen as a portion thereof.

After that, in the case where there arises the necessity to close the menu screen such as when receiving a "close menu" instruction from the user input unit 107, the control unit 102 instructs the output processing unit 112 to end the menu. Upon receiving the instruction to end the menu from the control unit 102, the output processing unit 112 ends the creation and output of the menu screen, and outputs the video/audio data received from the switch 108 to the data output I/F 109.

<Recording Operation>

Upon receiving an instruction to perform recording from the user input unit 107, the control unit 102 instructs the encoder 105 and the disc management unit 104 to record the data of the television broadcast. The encoder 105 converts the video/audio data received from the tuner 103 into data suitable to be recorded onto the DVD-RAM disc 111, and outputs the resultant data to the disc management unit 104. The data suitable to be recorded is, for example, data in MPEG2-Program Stream (PS) format.

The disc management unit 104 records the data received from the encoder 105 into the DVD-RAM disc 111. When this is done, the input of the switch 108 remains the one from the tuner 103, and an EE screen is outputted from the data output I/F 109.

<Reproduction Operation>

Upon receiving an instruction to start reproduction from the user input unit 107, the control unit 102 instructs the decoder 106 and the disc management unit 104 to reproduce the content. In addition, the control unit 102 instructs the switch 108 to switch the input to the decoder 106.

Upon receiving the instruction from the control unit 102, the switch 108 switches the input to the decoder 106. The disc management unit 104 reads the content instructed by the control unit 102 from the DVD-RAM disc 111, and outputs it to the decoder 106. The decoder 106 converts the content received from the disc management unit 104 into video/audio data, and outputs the resultant data to the switch 108. The switch 108 outputs the video/audio data received from the decoder 106 to the output processing unit 112. The output processing unit 112 outputs the video/audio data received from the switch 108 to the data output I/F 109. When this is done, there is the case where the output processing unit 112 processes the video/audio data in accordance with an instruction from the control unit 102, to, for example, additionally display the text "reproduction". The data output I/F 109 outputs the video/audio data received from the output processing unit 112 to the television 131 through the data cable 122.

Upon receiving an instruction to stop the reproduction from the user input unit 107, the control unit 102 instructs the decoder 106 and the disc management unit 104 to stop reproducing the content. Furthermore, the control unit 102 instructs the switch 108 to switch the input to the tuner 103.

When the reproduction of the DVD-RAM disc 111 ends, the DVD recorder 101 returns to the state in which neither recording nor reproduction is carried out, and an EE screen is outputted from the data output I/F 109.

<Command Sending Operation>

When the data output I/F 109 starts outputting data reproduced from the DVD-RAM disc 111 or outputting the menu screen, the control unit 102 instructs the command output I/F 110 to send a "start output" command. The command output I/F 110 sends the "start output" command to the television 131 through the command cable 123.

Meanwhile, when the data output I/F 109 starts outputting an EE screen after ending the output of the data reproduced from the DVD-RAM disc 111 or the output of the menu screen, the control unit 102 instructs the command output I/F 110 to send a "return to EE screen" command. The command output I/F 110 sends the "return to EE screen" command to the television 131 through the command cable 123.

(2) Operation of Television 131

Next, an operation of the television 131 is described.

The user can input, to the user input unit 138, various instructions such as "switch inputs", "select channel", "display menu", "close menu", and so forth. Upon receiving an instruction from the user, the user input unit 138 outputs such instruction to the control unit 134. The control unit 134 controls an operation of each component of the television 131 in accordance with the details of the instruction from the user input unit 138.

<Manual Input Switching Operation>

Upon receiving an instruction to switch the input from the user input unit 138, the control unit 134 instructs the switch 137 to switch the input. Upon receiving, from the control unit 134, the instruction to switch the input to the data input I/F 139 while outputting the input from the tuner 136 to the output processing unit 135, the switch 137 outputs the video/audio data received from the data input I/F 139 to the output processing unit 135.

<Television Broadcast Viewing Operation>

In the case of viewing a television broadcast, the input of the switch 137 is set to the tuner 136.

The tuner 136 extracts the video/audio data of a specified channel from the television broadcast received by the antenna 121, and outputs it to the switch 137. The switch 137 outputs the video/audio data received from the tuner 137 to the output processing unit 135. Of the video/audio data received from the switch 137, the output processing unit 135 outputs the video data to the screen 132 and outputs the audio data to the speaker 133. When this is done, there is the case where the output processing unit 135 processes the video data in accordance with an instruction from the control unit 134, to, for example, additionally display a reception channel number.

<External Device Viewing Operation>

In the case of viewing video from an external device, the input of the switch 137 is set to the data input I/F 139 or the data input I/F 141. Here, a description is given of an operation to be performed in the case where the input of the switch 137 is set to the data input I/F 139.

The data input I/F 139 receives the video/audio data from the DVD recorder 101 through the data cable 122, and outputs it to the switch 137. The switch 137 outputs the video/audio data received from the data input I/F 139 to the output processing unit 135.

The subsequent operations are the same as those of the television broadcast viewing operation. The operations to be performed in the case where the input of the switch 137 is set to the data input I/F 141 are also the same.

<Menu Screen Display Operation>

The menu screen here refers to: a screen on which setting of the television 131 is performed; a program list such as an EPG; a screen on which a connected device is operated; and the like.

Upon receiving a "display menu" instruction from the user input unit 138, the control unit 134 instructs the output processing unit 135 to create and output a menu screen. The output processing unit 135 creates data for the menu screen instructed by the control unit 134, and displays the resulting data onto the screen 132. In addition, the output processing unit 135 outputs the audio data to the speaker 133 if necessary. When this is done, there is the case where the output processing unit 135 incorporates the video/audio data received from the switch 137 into the menu screen as a portion thereof.

After that, in the case where there arises the necessity to close the menu screen such as when receiving a "close menu" instruction from the user input unit 138, the control unit 134 instructs the output processing unit 135 to end the menu. Upon receiving the instruction to end the menu from the control unit 134, the output processing unit 135 ends the creation and output of the menu screen, and outputs the video/audio data received from the switch 137 to the screen 132 and the speaker 133.

<Automatic Input Switching Operation>

Upon receiving a command from the DVD recorder 101 through the command cable 123, the command input I/F 140 outputs such command to the control unit 134. In the case where the command received from the command input I/F 140 is a "start output" command, the control unit 134 instructs the switch 137 to switch the input to the data input I/F 139.

Meanwhile, in the case where the command received from the command input I/F 140 is a "return to EE screen" command and the input of the switch 137 at that point in time is the data input I/F 139, the control unit 134 instructs the switch 137 to switch the input to the tuner 136. On the other hand, when the input of the switch 137 at that point in time is from an element other than the data input I/F 139, the switch 137 will not switch the input.

(3) Operations of DVD Recorder 101 and Television 131

Figure 3:
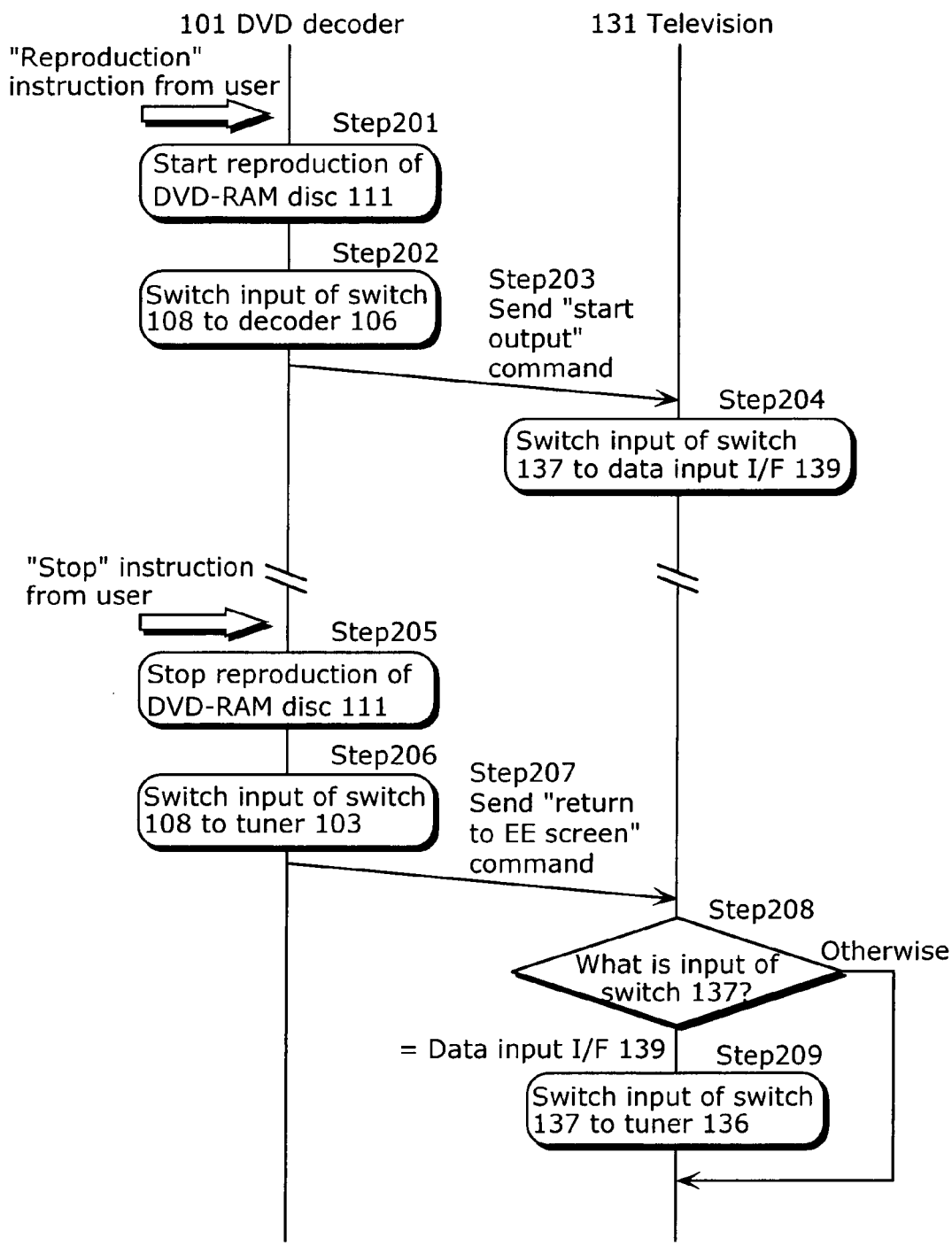
FIG. 3 is a flowchart of the DVD recorder and the television in the first embodiment.

FIG. 3 is a flowchart which shows operations of the DVD recorder 101 and the television 131.

The following describes operations performed by the DVD recorder 101 and the television 131 when the reproduction by the DVD recorder 101 starts/stops. Here, it is assumed that the input of the television 131 is set to the tuner 136, and that the user is viewing the television broadcast received by the tuner 136.

Upon receiving a "start reproduction" instruction from the user, the DVD recorder 101 starts the reproduction of the DVD-RAM disc 111 (Step 201), and switches the input of the switch 108 to the decoder 106 (Step 202). At the same time, the DVD recorder 101 sends a "start output" command to the television 131 (Step 203).

Upon receiving the "start output" command, the television 131 switches the input of the switch 137 to the data input I/F 139 (Step 204). In this case, it is possible to view the video/audio reproduced from the DVD-RAM disc 111 outputted from the DVD recorder 101.

After that, upon receiving the "stop reproduction" instruction from the user, the DVD recorder 101 stops the reproduction of the DVD-RAM disc 111 (Step 205), and switches the input of the switch 108 to the tuner 103 (Step 206). At the same time, the DVD recorder 101 sends a "return to EE screen" command to the television 131 (Step 207).

Upon receiving the "return to EE screen" command, the television 131 checks if the input of the switch 137 is the one from the data input I/F 139 (Step 208). In the case where the input of the switch 137 is the one from the data input I/F 139, the television 131 switches the input of the switch 137 to the tuner 136 (Step 209). In this case, it is possible to view the television broadcast received by the tuner 136 again. Meanwhile, in the case where the input of the switch 137 is from an element other than the data input I/F 139, the input of the switch 137 will not be switched.

Figure 4:
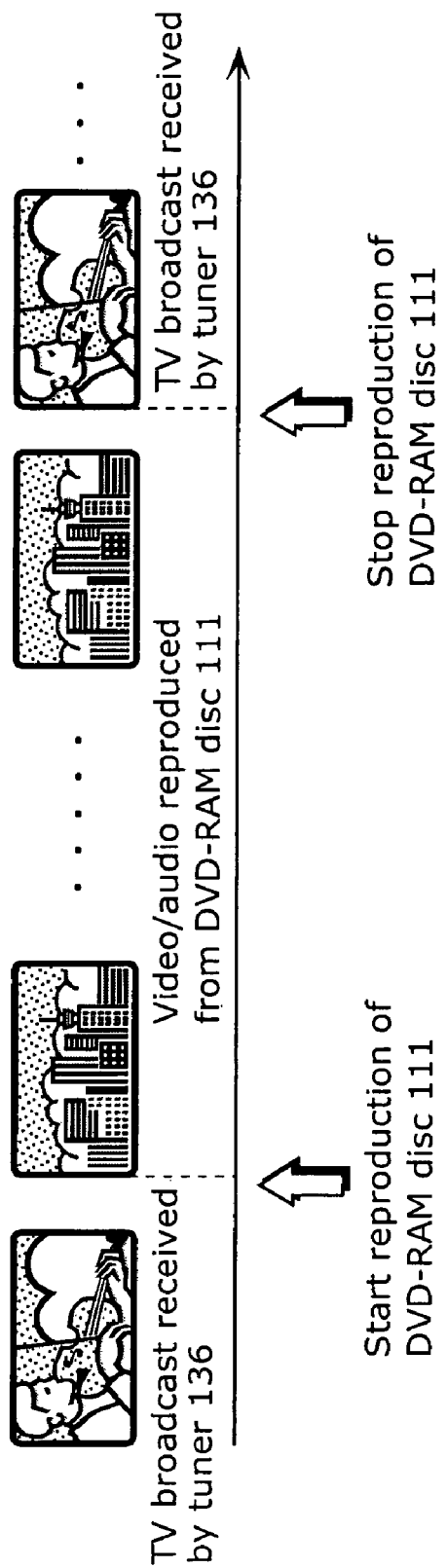
FIG. 4 is a diagram which shows the transition of screens displayed on the television in the first embodiment.

FIG. 4 is a diagram which shows the transition of screens displayed on the television 131. Here, it is assumed that the input of the television 131 has not been manually switched during the period of time from when the reproduction of the DVD-RAM disc 111 starts to when its reproduction stops.

To be more specific, when the reproduction by the DVD recorder 101 starts while the television broadcast received by the tuner 136 is viewed, the input of the television 131 automatically switches to the DVD recorder 101, and the video reproduced from the DVD-RAM disc 111 is to be displayed (Step 204). When the reproduction by the DVD recorder 101 stops, the input of the television 131 automatically switches to the tuner 136, and the television broadcast received by the tuner 136 is to be displayed (Step 209).

Figure 5:
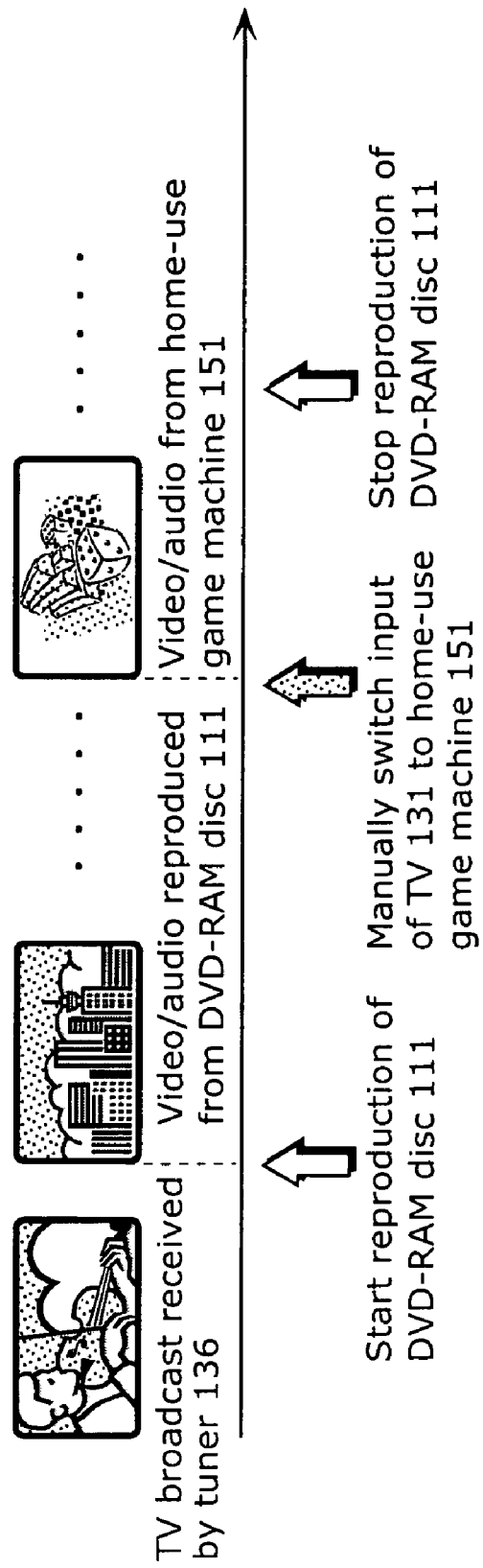
FIG. 5 is a diagram which shows the transition of screens displayed on the television in the first embodiment.

FIG. 5 is a diagram which shows the transition of screens displayed on the television 131. Here, it is assumed that the input of the television 131 has not manually switched during the period of time from when the reproduction of the DVD-RAM disc 111 starts to when its reproduction stops.

To be more specific, when the reproduction by the DVD recorder 101 starts while the television broadcast received by the tuner 136 is viewed, the input of the television 131 automatically switches to the DVD recorder 101, and the video reproduced from the DVD-RAM disc 111 is to be displayed, as in the case of FIG. 4. When the input of the television 131 is manually switched to the data input I/F 141 while the reproduction of the DVD-RAM disc 111 is carried out, the screen of the home-use game machine 151 is to be displayed.

After that, even when the reproduction of the DVD recorder 101 stops, the input of the television 131 will not be switched since the input of the television 131 is not the one from the data input I/F 139. In other words, the screen of the home-use game machine 151 keeps being displayed.

Operations to be performed when the display of the menu screen of the DVD recorder 101 starts and ends are the same as those shown in the flowchart of FIG. 3. In other words, the DVD recorder 101 sends, to the television 131, the "start output" command at the time of starting the menu screen display and the "return to EE screen" command at the time of ending the menu screen display.

Figure 6:
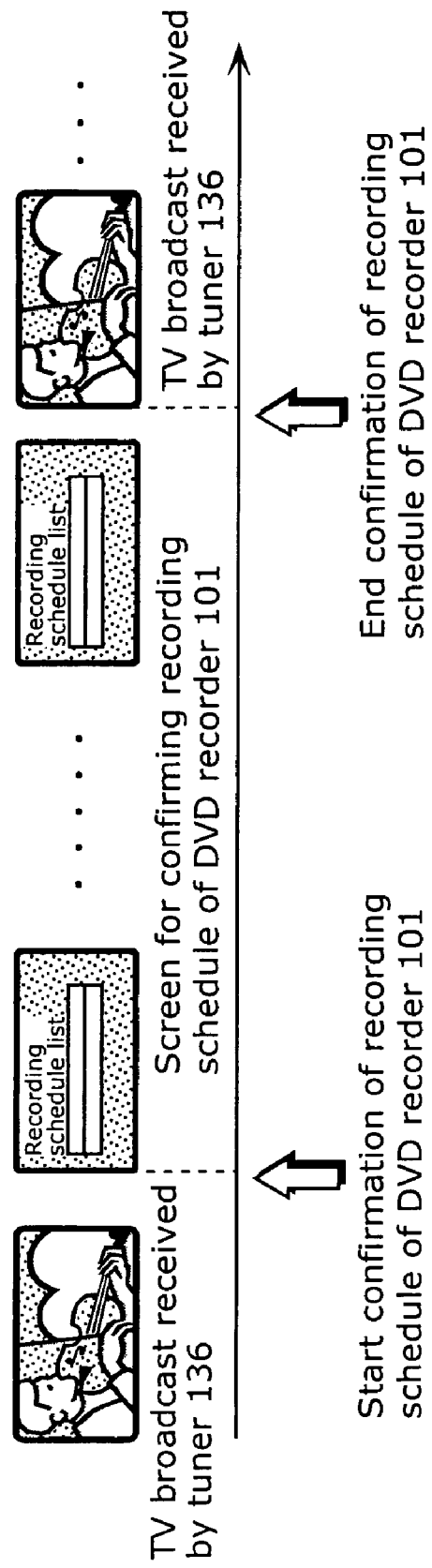
FIG. 6 is a diagram which shows the transition of screens displayed on the television in the first embodiment.

FIG. 6 is a diagram which shows the transition of screens displayed on the television 131. To be more specific, when lo the menu display of the DVD recorder 101 starts while the television broadcast received by the tuner 136 is viewed, the input of the television 131 automatically switches to the DVD recorder 101, and the menu screen of the DVD recorder 101 is to be displayed. Meanwhile, when the menu display of the DVD recorder 101 ends, the input of the television 131 automatically switches to the tuner 136, and the television broadcast received by the tuner 136 is to be displayed.

As described above, according to the first embodiment, it is possible to automatically switch the input of the television 131 to the television broadcast received by the tuner 136 when the output of the DVD recorder 101 returns to the EE screen, only in the case where the input of the television 131 is set to the one from the DVD recorder 101. In other words, since the input of the television 131 will not be switched in the case where the input of the television 131 is not the one from the DVD recorder 101 when the screen returns to the EE screen, it is possible to prevent the user from being confused.

Note that the order of Step 201, Step 202 and Step 203 in the flowchart of FIG. 3 may be interchanged, or these may be performed at the same time. Similarly, the order of Step 205, Step 206 and Step 207 in the flowchart of FIG. 3 may be interchanged, or these may be performed at the same time.

Furthermore, the DVD recorder 101 may include an external input I/F for establishing a connection with an external device, such that video/audio data outputted from the external device and a television broadcast received by the tuner 103 can be switched therebetween.

Furthermore, a recording medium recorded and reproduced by the DVD recorder 101 is not limited to a DVD-RAM disc, and thus it may be another removable medium such as a DVD-R disc, or may be a fixed medium such as a hard disk. The DVD recorder may be a recording/reproduction apparatus capable of performing recording and reproduction of one or more types of recording media. The DVD recorder may not include the encoder, and a reproduction-only apparatus such as a DVD player that performs only the reproduction of a recording medium such as a DVD-RAM may be adopted in replacement of the DVD recorder.

Figure 7:
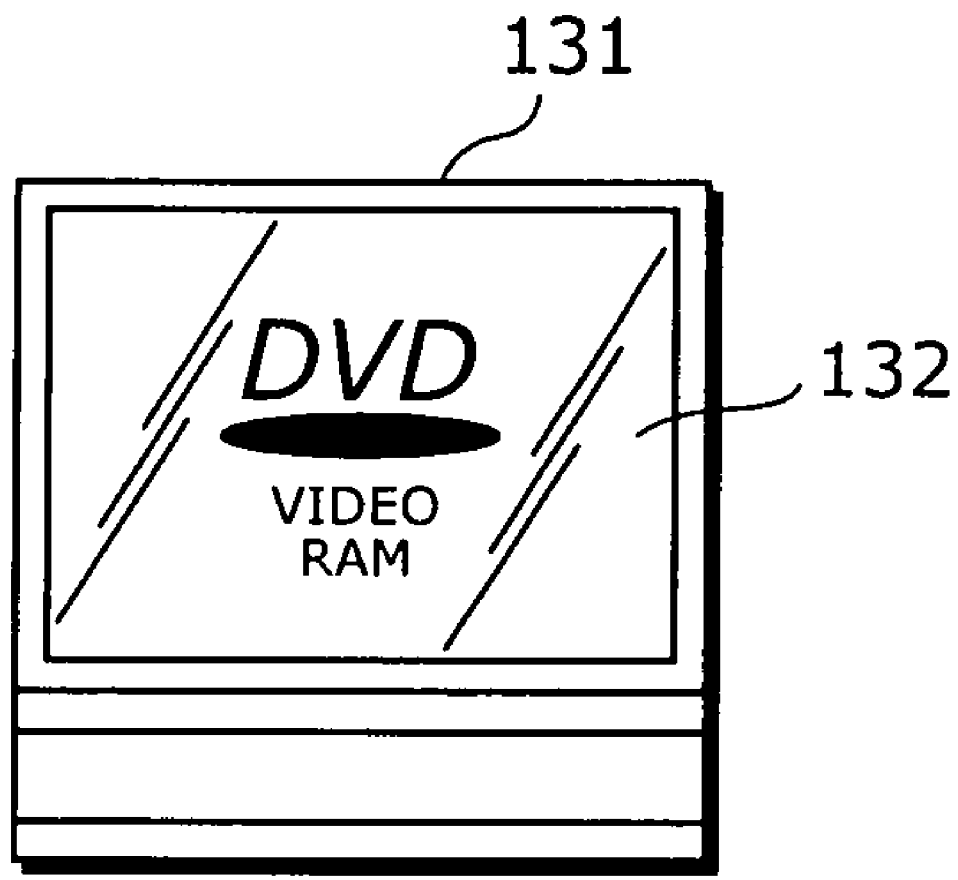
FIG. 7 is a diagram which shows a screen displayed on the television in the first embodiment.

Moreover, the DVD recorder 101 may not include the tuner. In this case, a predetermined screen as shown in FIG. 7 is set to be outputted when the reproduction of the DVD-RAM disc is not carried out, and a "return to EE screen" command is set to be outputted to the television 131 when the screen returns to such predetermined screen.

In the above description, although the commands are the "start reproduction" command and the "return to EE screen" command, any commands may be used as long as they indicate the timing of switching the input of the television 131 to another.

In the above description, although the television 131 includes two data input I/Fs, it may include one, or three or more data input I/Fs. These data input I/Fs may be of the same type or of different types. Furthermore, the number of devices that can be connected to the data input I/Fs at the same time may be either one or more. In other words, it is acceptable as long as it is possible to identify the device that has sent the command received by the command input I/F 140 and to switch the input of the television 131 to such device having sent the command.

Moreover, the number of cables making up the data cable 122 and the command cable 123 may be either one or more, or a bundle of plural signal wires may serve as a single cable. In addition, a structure may be adopted in which data is transmitted as a wireless signal such as an infrared signal, rather than by using cable.

In addition, although FIG. 3 shows, as an example, the structure in which the television 131 includes the screen 132, the present invention is not limited to this. In other words, the television 131 may be an output control apparatus having no screen.

Second Embodiment

The television according to the second embodiment of the present invention automatically switches the input of the tuner 136 upon receiving a "return to EE screen" command, only in the case where the input at the time of receiving a "start reproduction" command from the DVD recorder 101 is the one from the tuner 136 and where such input has not been manually switched in the middle. The following describes the second embodiment by focusing on the differences from the first embodiment.

Figure 8:
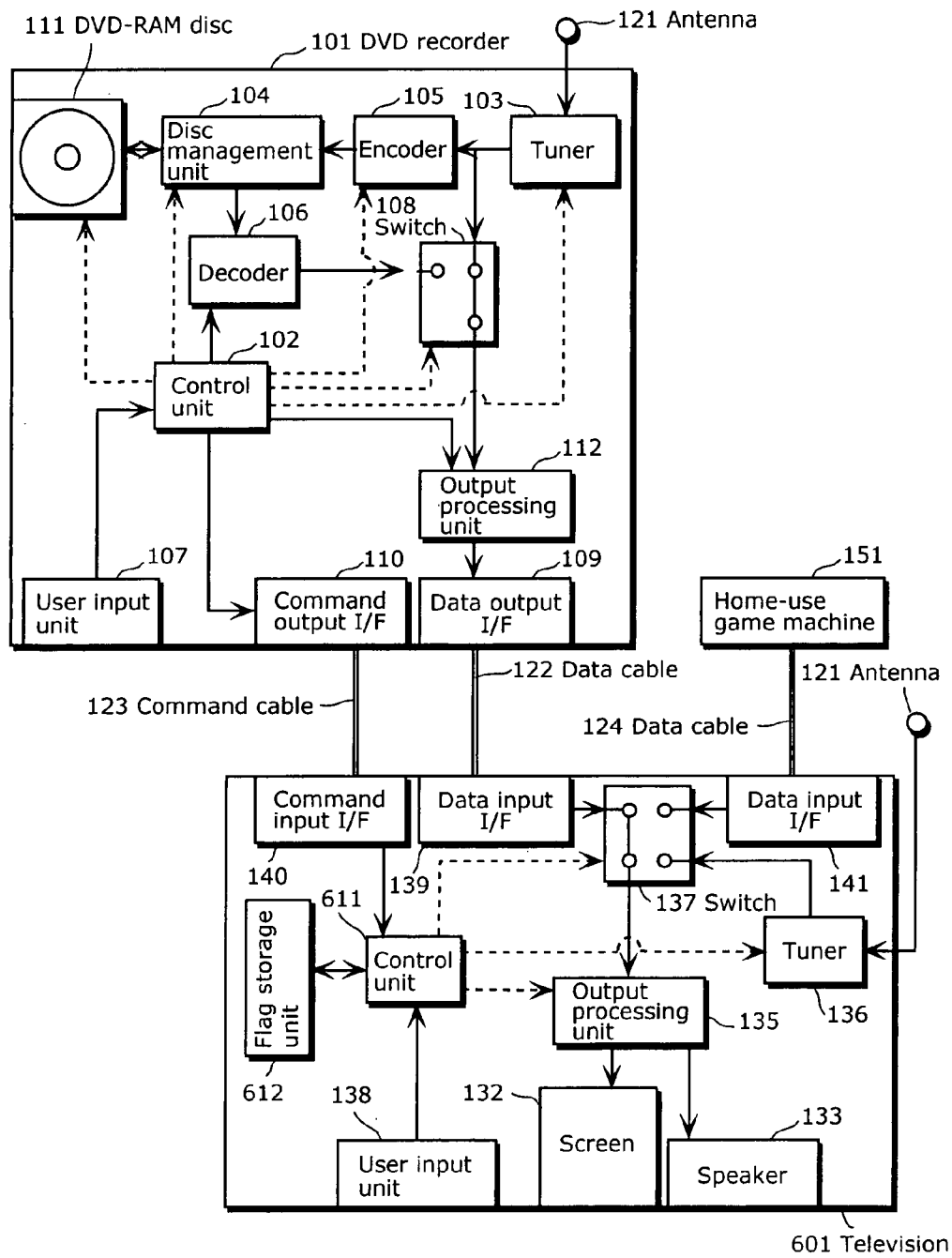
FIG. 8 is a diagram which shows example structures of a television and a DVD recorder in a second embodiment.

FIG. 8 is a diagram which shows example structures of a television 601 and the DVD recorder 101. The differences from the first embodiment are the function of a control unit 611 of the television 601 and that television 601 includes a flag storage unit 612. The other components have the same functions as those of the first embodiment, and thus they will be described using the same reference numbers.

The operation of the DVD recorder 101 is the same as that of the first embodiment, and thus its description will not be given.

(1) Operation of Television 601

The following describes operations performed by the television 601: an operation for manually switching inputs and an operation to be performed at the time of command reception. These operations are different from the operations of the television 131 of the first embodiment.

<Manual Input Switching Operation>

Upon receiving an instruction to switch the input from the user input unit 138, the control unit 611 instructs the switch 137 to switch the input. Upon receiving, from the control unit 611, the instruction to switch the input to the data input I/F 139 while outputting the input from the tuner 136 to the output processing unit 135, the switch 137 outputs the video/audio data received from the data input I/F 139 to the output processing unit 135. At this time, the control unit 611 stores, into the flag storage unit 612, "TRUE" as a value of a switch flag.

<Operation at Command Reception Time>

Upon receiving a command from the DVD recorder 101 through the command cable 123, the command input I/F 140 outputs such command to the control unit 611. In the case where the command received from the command input I/F 140 is a "start output" command, the control unit 611 instructs the switch 137 to switch the input to the data input I/F 139. At this time, the control unit 611 stores, into the flag storage unit 612, "FALSE" in the case where the former input of the switch 137 is the one from the tuner 136, whereas it stores "TRUE" in the other cases, as a value of the switch flag.

Meanwhile, in the case where the command received from the command input I/F 140 is a "return to EE screen" command, the control unit 611 refers to the value of the switch flag stored in the flag storage unit 612. When the value of the switch flag is "FALSE", the control unit 611 instructs the switch 137 to switch the input to the data input I/F 139. On the other hand, when the value of the switch flag is "TRUE", it will not instruct the switch 137 to switch the input.

(2) Operations of DVD Recorder 101 and Television 601

Figure 9:
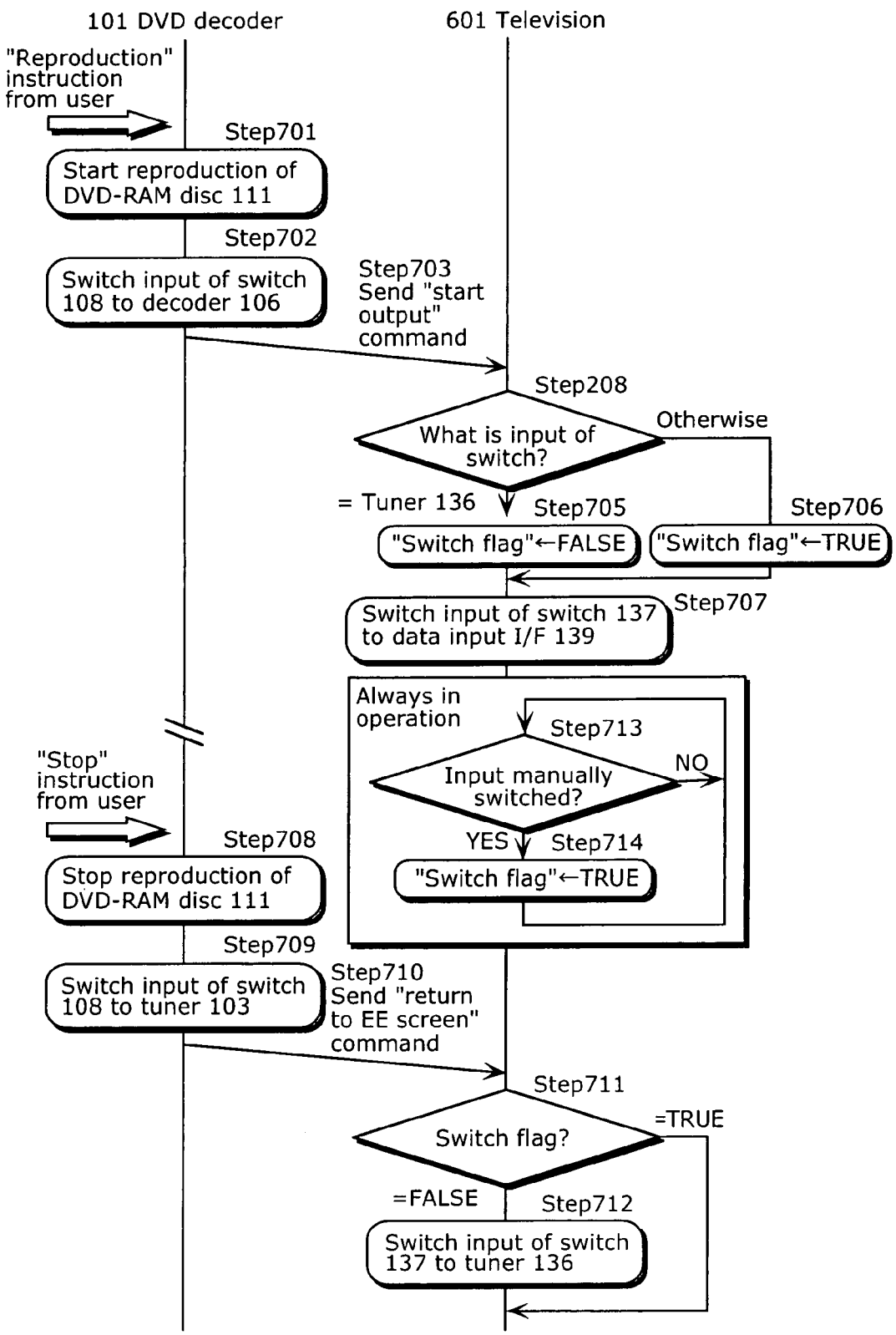
FIG. 9 is a flowchart of the DVD recorder and the television in the second embodiment.

FIG. 9 is a flowchart of the DVD recorder 101 and the television 601. The following describes operations to be performed by the DVD recorder 101 and the television 601 when the reproduction by the DVD recorder 101 starts/stops.

Upon receiving a "start reproduction" instruction from the user, the DVD recorder 101 starts the reproduction of the DVD-RAM disc 111 (Step 701), and switches the input of the switch 108 to the decoder 106 (Step 702). At the same time, the DVD recorder 101 sends a "start output" command to the television 601 (Step 703).

Upon receiving the "start output" command, the television 601 checks the input of the switch 137 (Step 704). In the case where the input of the switch 137 is the one from the tuner 136, the television 601 sets the value of the switch flag to "FALSE" (Step 705). On the other hand, in the case where the input of the switch 137 is from an element other than the tuner 136, the television 601 sets the value of the switch flag to "TRUE" (Step 706).

After that, the television 601 switches the input of the switch 137 to the data input I/F 139 (Step 707). In this case, it is possible to view the video/audio reproduced from the DVD-RAM disc 111 outputted from the DVD recorder 101.

After that, upon receiving the "stop reproduction" instruction from the user, the DVD recorder 101 stops the reproduction of the DVD-RAM disc 111 (Step 708), and switches the input of the switch 108 to the tuner 103 (Step 709). At the same time, the DVD recorder 101 sends a "return to EE screen" command to the television 601 (Step 710).

Upon receiving the "return to EE screen" command, the television 601 checks the value of the switch flag (Step 711). In the case where the value of the switch flag is "FALSE", the television 601 switches the input of the switch 137 to the tuner 136 (Step 712). In this case, it is possible to view the television broadcast received by the tuner 136 again. On the other hand, when the value of the switch flag is "TRUE", the input of the switch 137 will not be switched.

The television 601 always checks if any input switching has been manually performed (Step 713). In the case where input switching has been manually performed, the television 601 sets the value of the switch flag to "TRUE" (Step 714).

The following describes the transition of screens on the television 601 when it displays the television broadcast received by the tuner 136 in the state in which the input of the television 601 is set to the one from the tuner 136.

Figure 10:
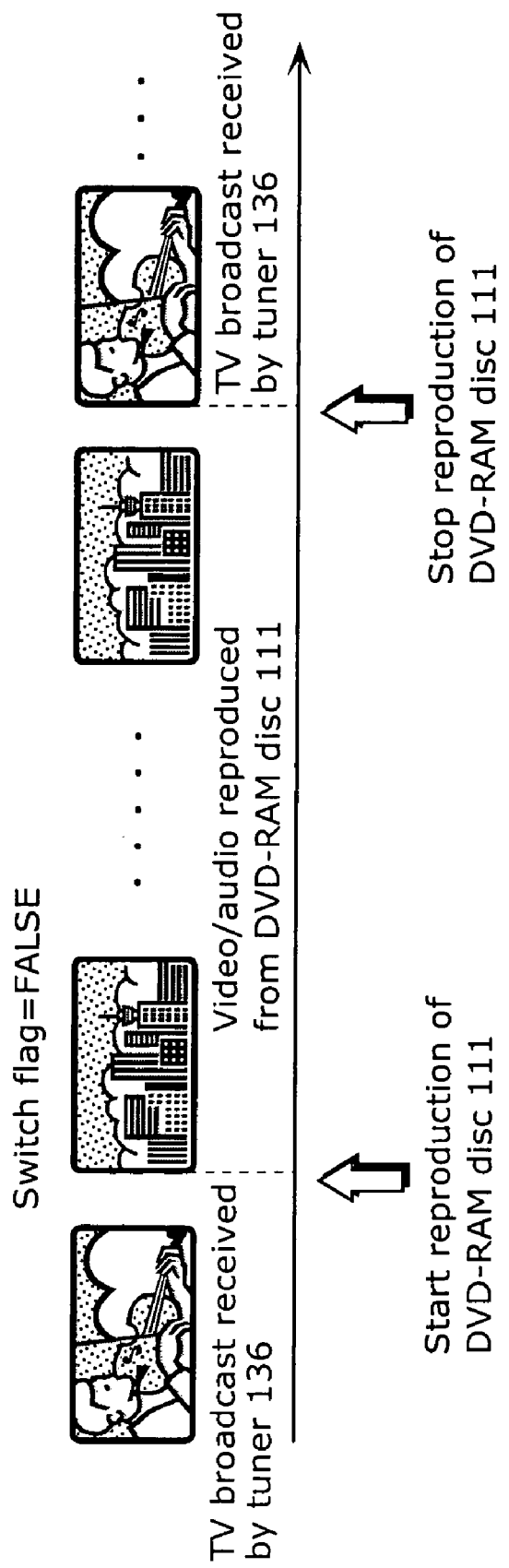
FIG. 10 is a diagram which shows the transition of screens displayed on the television in the second embodiment.

FIG. 10 is a diagram which shows the transition of screens displayed on the television 601. Here, it is assumed that the input of the television 601 has not been manually switched during the period of time from when the reproduction of the DVD-RAM disc 111 starts to when its reproduction stops.

To be more specific, when the reproduction by the DVD recorder 101 starts while the television broadcast received by the tuner 136 is viewed, the input of the television 601 automatically switches to the DVD recorder 101, and the video reproduced from the DVD-RAM disc 111 is to be displayed (Step 707). At this time, the value of the switch flag is set to "FALSE". When the reproduction by the DVD recorder 101 stops, the input of the television 601 automatically switches to the tuner 136, and the television broadcast received by the tuner 136 is to be displayed, since the value of the switch flag is "FALSE" (Step 712).

Figure 11:
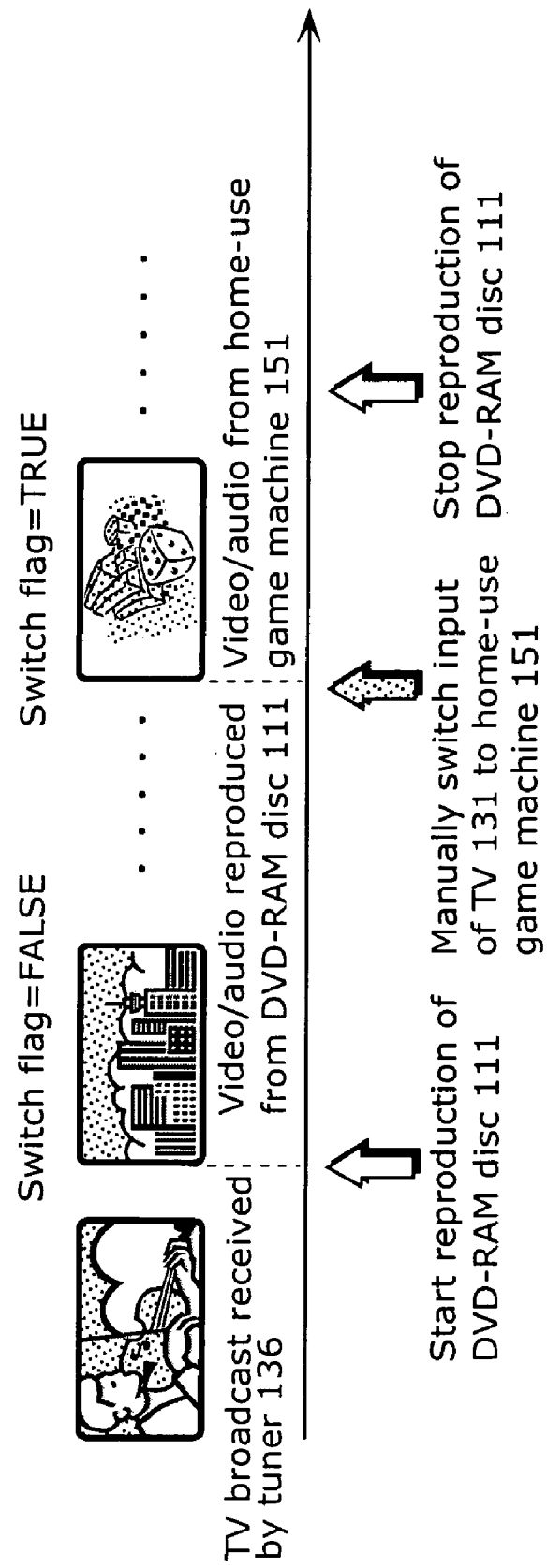
FIG. 11 is a diagram which shows the transition of screens displayed on the television in the second embodiment.

FIG. 11 is a diagram which shows the transition of screens displayed on the television 601. Here, it is assumed that the input of the television 601 has been manually switched during the period of time from when the reproduction of the DVD-RAM disc 111 starts to when its reproduction stops.

To be more specific, when the reproduction by the DVD recorder 101 starts while the television broadcast received by the tuner 136 is viewed, the input of the television 601 automatically switches to the DVD recorder 101, and the video reproduced from the DVD-RAM disc 111 is to be displayed, as in the case of FIG. 10. At this time, the value of the switch flag is set to "FALSE".

When the input of the television 601 is manually switched to the data input I/F 141 while the reproduction of the DVD-RAM disc 111 is carried out, the screen of the home-use game machine 151 is to be displayed, and the value of the switch flag is set to "TRUE". After that, even when the reproduction by the DVD recorder 101 stops, the input of the television 601 will not be switched since the value of the switch flag is "TRUE", and the screen of the home-use game machine 151 keeps being displayed.

The following describes the transition of screens on the television 601 when it displays the video outputted from the DVD recorder 101 in the state in which the input of the television 601 is set to the one from the data input I/F 139.

Figure 12:
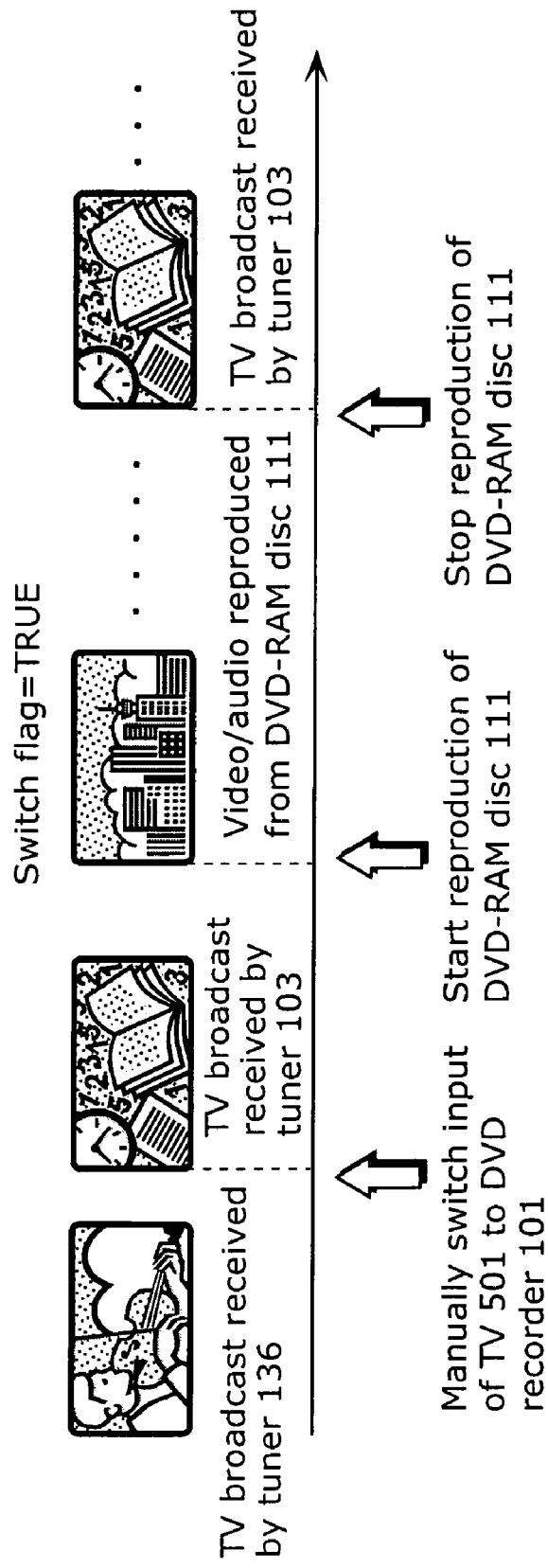
FIG. 12 is a diagram which shows the transition of screens displayed on the television in the second embodiment.

FIG. 12 is a diagram which shows the transition of screens displayed on the television 601. Here, it is assumed that the input of the television 601 has not been manually switched during the period of time from when the reproduction of the DVD-RAM disc 111 starts to when its reproduction stops.

To be more specific, when the reproduction by the DVD recorder 101 starts while the video outputted from the DVD recorder 101 is displayed, the video reproduced from the DVD-RAM disc 111 keeps being displayed, since the input of the television 601 is the one from the DVD recorder 101 (Step 707). At this time, the value of the switch flag is set to "TRUE", since the input of the switch 137 is not the one from the tuner 136.

When the reproduction by the DVD recorder 101 stops, the input of the television 601 will not be switched, since the value of the switch flag is "TRUE", and the video outputted from the DVD recorder 101 (the EE screen of the DVD recorder 101) is to be displayed.

Meanwhile, the transition of screens displayed on the television 601 in the case where the input of the television 601 has been manually switched during the period of time from when the reproduction of the DVD-RAM disc 111 starts to when its reproduction stops, is the same as the transition of screens in the case where the initial state is a state of viewing a television broadcast. In other words, the input of the television 601 will not be switched.

As described above, according to the second embodiment, it is possible to automatically switch the input of the television 601 to the television broadcast received by the tuner 136 when the output of the DVD recorder 101 returns to the EE screen, only in the case where the input of the television 601 at the point in time when the reproduction by the DVD recorder 101 starts is set to the television broadcast received by the tuner 136 and where such input has not been manually switched in the middle.

With the above structure, in addition to achieving the effect provided by the first embodiment, it is possible to ensure that the input of the television 601 will not be automatically switched to the television broadcast received by the tuner 136 when the output of the DVD recorder 101 returns to the EE screen, in the case where, for example, the input of the television 601 is switched to the DVD recorder 101 before starting the reproduction of the DVD recorder 101 and displaying the menu screen.

Note that in the above description, although the value of the switch flag is "TRUE" or "FALSE", other values than these may be used. In brief, any information may be used as long as it is possible to judge whether it is necessary to automatically switch the input of the television 601 at the time of receiving the "return to EE screen" command.

Note that the order of Step 701, Step 702 and Step 703 in the flowchart of FIG. 9 may be interchanged, or these may be performed at the same time. Similarly, the order of Step 708, Step 709 and Step 710 may be interchanged, or these may be performed at the same time.

Also note that although the operations to be performed in the case where the DVD recorder 101 reproduces the DVD-RAM disc 111 have been described as an example, the input of the television 601 automatically switches through the same operations as those described above, also in the case where the DVD recorder 101 displays the menu screen. The transition of screens in such case is the same as the transition of screens shown in FIG. 6 described in the first embodiment, and thus its description will not be given here.

Third Embodiment

The television according to the third embodiment of the present invention stores the input at the point in time when a "start output" command is received from the DVD recorder 101 (such input is hereinafter referred to as a "former input"). Upon receiving a "return to EE screen" command, the television automatically switches the input to the former input only in the case where the input has not been manually switched in the middle. The following describes the third embodiment by focusing on the differences from the first embodiment.

Figure 13:
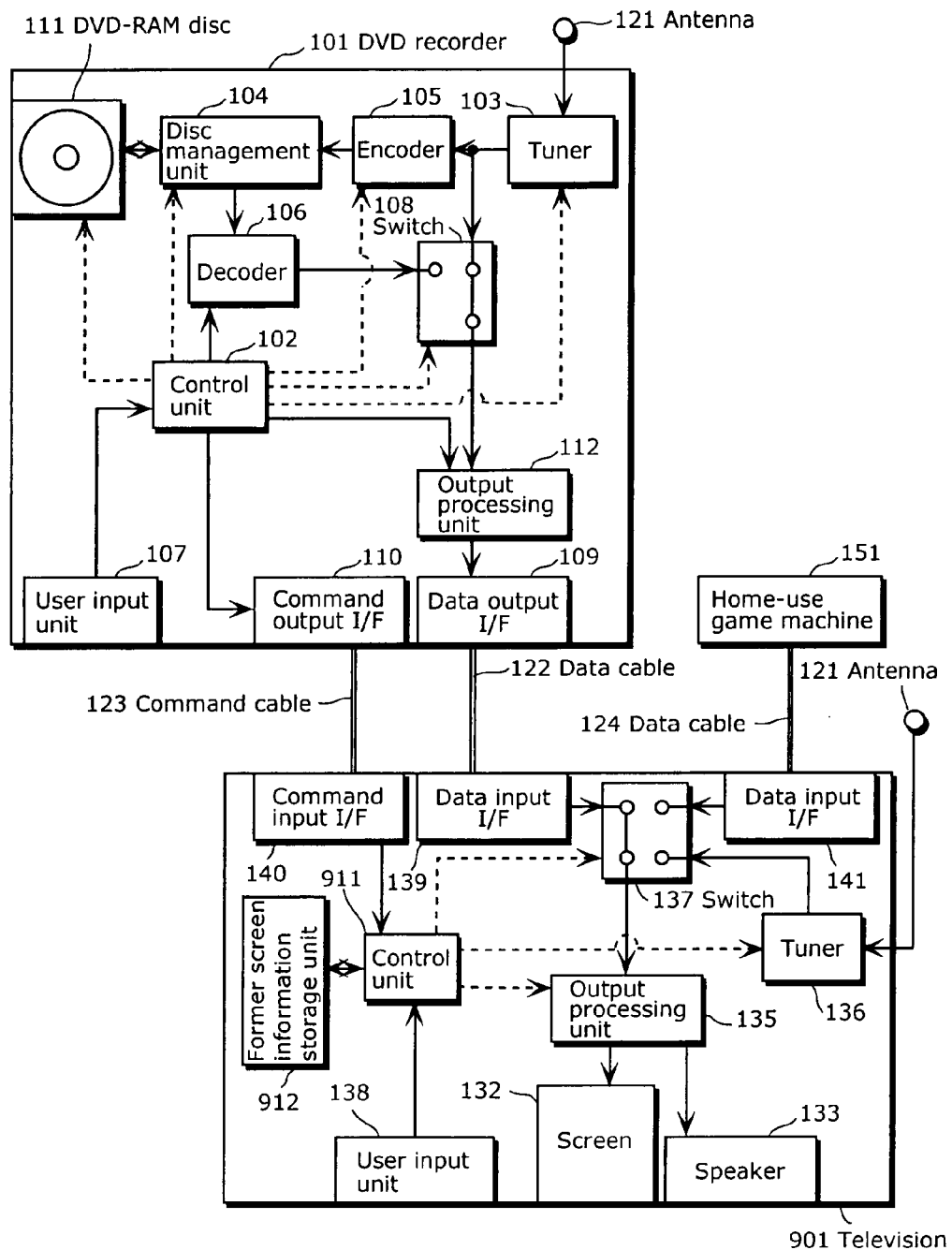
FIG. 13 is a diagram which shows example structures of a television and a DVD recorder in a third embodiment.

FIG. 13 is a diagram which shows example structures of a television 901 and the DVD recorder 101. The differences from the first embodiment are the function of a control unit 911 of the television 901 and that the television 901 includes a former screen information storage unit 912. The other components are the same as those of the first embodiment, and thus they will be described using the same reference numbers.

The operation of the DVD recorder 101 is the same as that of the first embodiment, and thus its description will not be given.

(1) Operation of Television 901

The following describes operations performed by the television 901: an operation for manually switching inputs and an operation to be performed at the time of command reception. These operations are different from the operations of the television 131 of the first embodiment.

FIG. 14 is a diagram which shows an example of former screen information. To be more specific, the former screen information storage unit 912 stores values that indicate the screens that are displayed at the point in time when a "start output" command is received from the DVD recorder 101. When the user switches the input manually, the former screen information stored in the former screen information storage unit 912 is to be reset. Here, the former screen information which has been reset is represented as "none".

<Manual Input Switching Operation>

Upon receiving an instruction to switch the input from the user input unit 138, the control unit 911 instructs the switch 137 to switch the input. Upon receiving, from the control unit 911, the instruction to switch the input to the data input I/F 139 while outputting the input from the tuner 136 to the output processing unit 135, the switch 137 outputs the video/audio data received from the data input I/F 139 to the output processing unit 135. At this time, the control unit 911 resets the former screen information stored in the former screen information storage unit 912.

<Operation at Command Reception Time>

Upon receiving a command from the DVD recorder 101 through the command cable 123, the command input I/F 140 outputs such command to the control unit 911. In the case where the command received from the command input I/F 140 is a "start output" command, the control unit 911 instructs the switch 137 to switch the input to the data input I/F 139. At this time, the control unit 911 stores information indicating the former input of the switch 137, into the former screen information storage unit 912 as former screen information. For example, in the case where the former input of the switch 137 is the one from the tuner 136, "TV broadcast" is to be stored, whereas in the case where the former input of the switch 137 is the one from the data input I/F 141, "game" is to be stored, respectively as the former screen information.

Meanwhile, in the case where the command received from the command input I/F 140 is a "return to EE screen" command, the control unit 911 refers to the former screen information stored in the former screen information storage unit 912, and instructs the switch 137 to switch to the input indicated by the former screen information. When the value of the former screen information is "none", the control unit 911 will not instruct the switch 137 to switch the input.

(2) Operations of DVD Recorder 101 and Television 901

Figure 15:
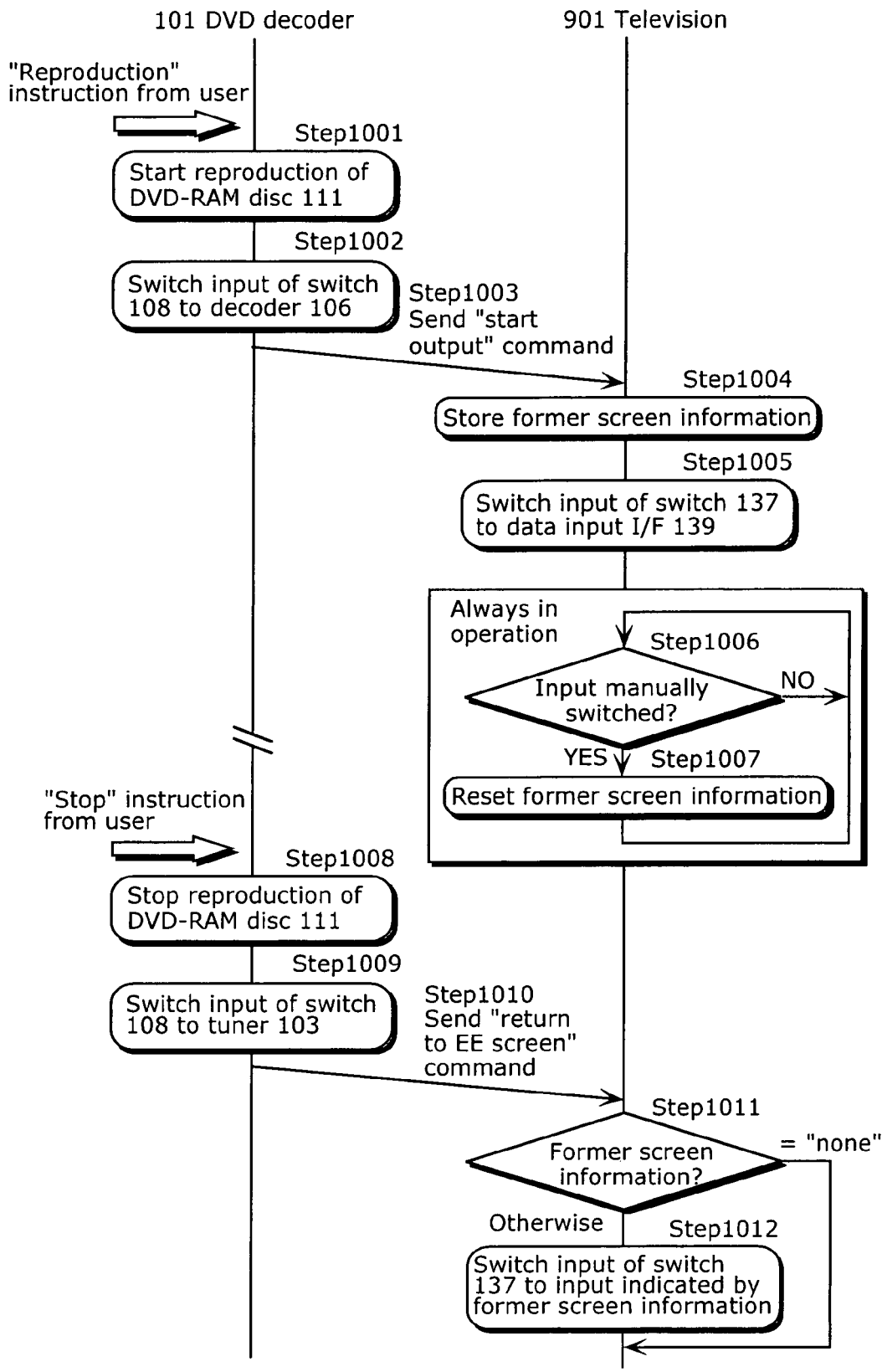
FIG. 15 is a flowchart of the DVD recorder and the television in the third embodiment.

FIG. 15 is a flowchart of the DVD recorder 101 and the television 901. The following describes operations performed by the DVD recorder 101 and the television 901 when the reproduction by the DVD recorder 101 starts/stops.

Upon receiving a "start reproduction" instruction from the user, the DVD recorder 101 starts the reproduction of the DVD-RAM disc 111 (Step 1001), and switches the input of the switch 108 to the decoder 106 (Step 1002). At the same time, the DVD recorder 101 sends a "start output" command to the television 901 (Step 1003).

Upon receiving the "return to EE screen" command, the television 901 checks the former screen information (Step 1011). In the case where the value of the former screen information is other than "none", the television 901 switches the input of the switch 137 to the screen indicated by the former screen information (Step 1012). For example, in the case where the input of the switch 137 before the reproduction by the DVD recorder 101 starts is the one from the tuner 136, the input of the switch 137 is switched to the tuner 136, since the former screen information indicates "TV broadcast". In this case, it is possible to view the television broadcast received by the tuner 136 again.

On the other hand, in the case where the former screen information indicates "none", the input of the switch 137 will not be switched. Furthermore, in the case where the former screen information indicates "DVR1", "game", and the like, the output from the external device indicated by the former screen information is to be directly displayed.

The television 901 always checks if any input switching has been manually performed (Step 1006). In the case where input switching has been manually performed, the television 901 sets the value of the former screen information to "none" (Step 1007).

The following describes the transition of screens on the television 901 when it displays the television broadcast received by the tuner 136 in the state in which the input of the television 901 is set to the one from the tuner 136.

Figure 16:
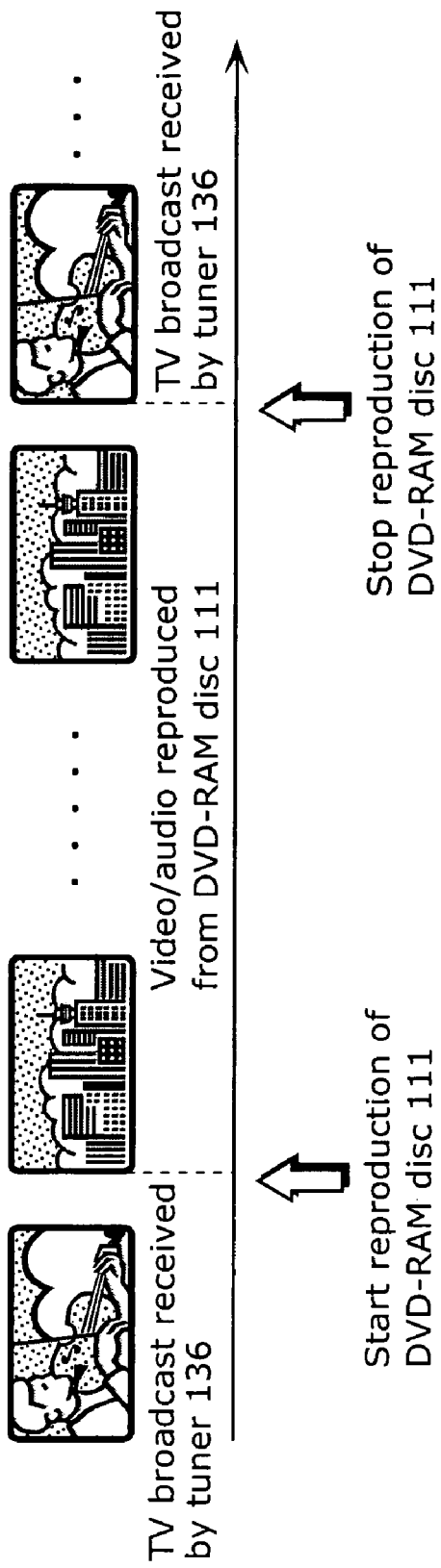
FIG. 16 is a diagram which shows the transition of screens displayed on the television in the third embodiment.

FIG. 16 is a diagram which shows the transition of screens displayed on the television 901. Here, it is assumed that the input of the television 901 has not been manually switched during the period of time from when the reproduction of the DVD-RAM disc 111 starts to when its reproduction stops.

To be more specific, when the reproduction by the DVD recorder 101 starts while the television broadcast received by the tuner 136 is viewed, the input of the television 901 automatically switches to the DVD recorder 101, and the video reproduced from the DVD-RAM disc 111 is to be displayed (Step 1004). At this time, the former screen information is set to "TV broadcast" (Step 1005). When the reproduction by the DVD recorder 101 stops, the input of the television 901 automatically switches to the tuner 136, and the television broadcast received by the tuner 136 is to be displayed, since the value of the former screen information indicates "TV broadcast" (Step 1012).

Figure 17:
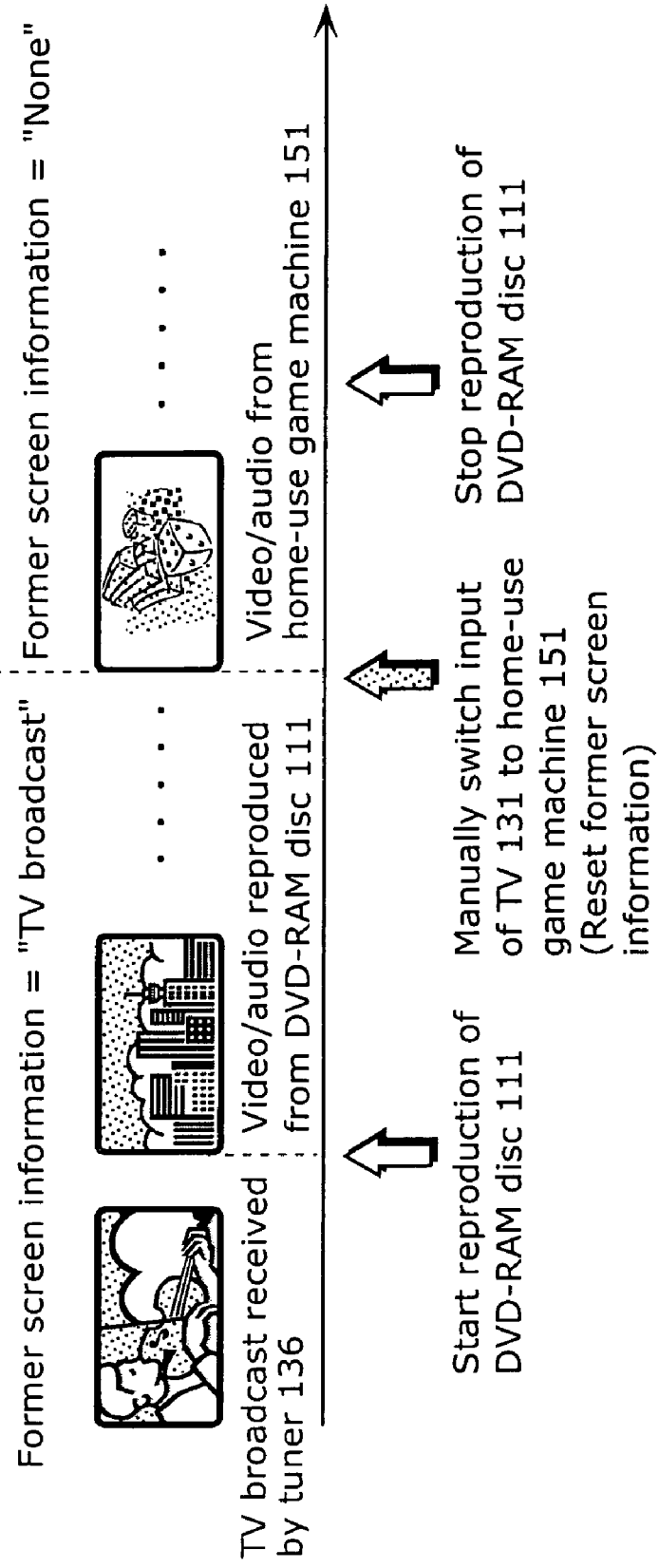
FIG. 17 is a diagram which shows the transition of screens displayed on the television in the third embodiment.

FIG. 17 is a diagram which shows the transition of screens displayed on the television 901. Here, it is assumed that the input of the television 901 has been manually switched during the period of time from when the reproduction of the DVD-RAM disc 111 starts to when its reproduction stops.

To be more specific, when the reproduction by the DVD recorder 101 starts while the television broadcast received by the tuner 136 is viewed, the input of the television 901 automatically switches to the DVD recorder 101, and the video reproduced from the DVD-RAM disc 111 is to be displayed, as in the case of FIG. 16 (Step 1004). At this time, the former screen information is set to "TV broadcast" (Step 1005).

When the input of the television 901 is manually switched to the data input I/F 141 while the reproduction of the DVD-RAM disc 111 is carried out, the screen of the home-use game machine 151 is to be displayed, and the former screen information is to be reset to "none" (Step 1007). After that, even when the reproduction of the DVD recorder 101 stops, the input of the television 901 will not be switched since the value of the former screen information indicates "none", and the screen of the home-use game machine 151 keeps being displayed.

The following describes the transition of screens on the television 901 when it displays the video outputted from the home-use game machine 151 in the state in which the input of the television 901 is set to the one from the data input I/F 141.

Figure 18:
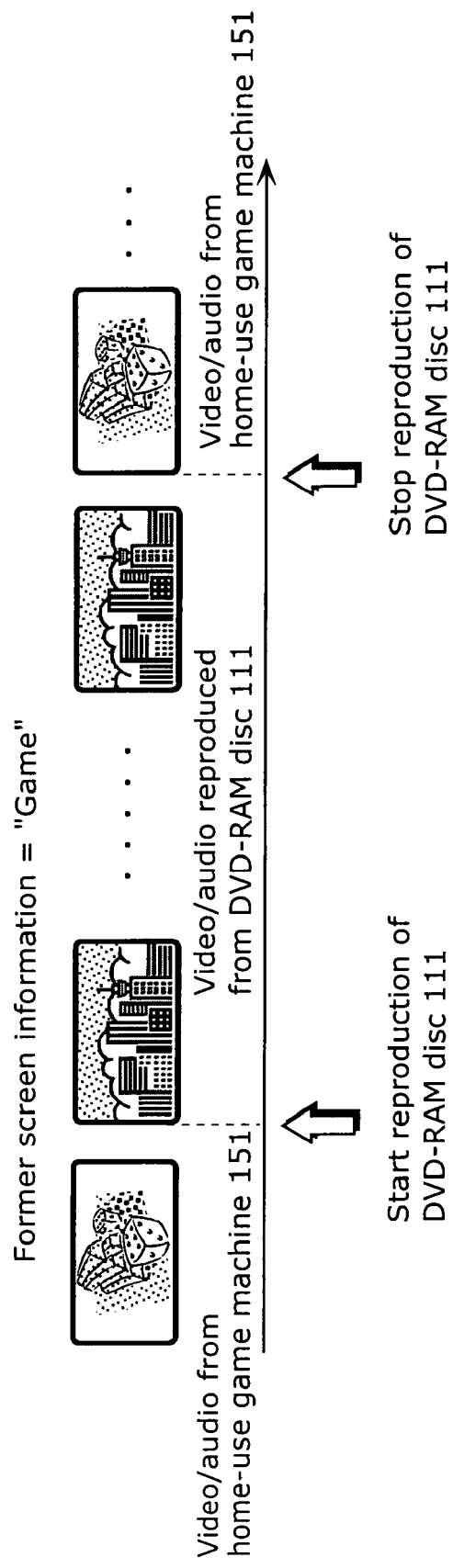
FIG. 18 is a diagram which shows the transition of screens displayed on the television in the third embodiment.

FIG. 18 is a diagram which shows the transition of screens displayed on the television 901. Here, it is assumed that the input of the television 901 has not been manually switched during the period of time from when the reproduction of the DVD-RAM disc 111 starts to when its reproduction stops.

To be more specific, when the reproduction by the DVD recorder 101 starts while the video outputted from the home-use game machine 151 is displayed, the input of the television 901 automatically switches to the DVD recorder 101, and the video reproduced from the DVD-RAM disc 111 is to be displayed (Step 1004). At this time, the former screen information is set to "game" (Step 1005).

Meanwhile, when the reproduction of the DVD recorder 101 stops, the input of the television 901 automatically switches to the home-use game machine 151 since the value of the former screen information indicates "game", and the video outputted from the home-use game machine 151 is to be displayed again (Step 1012).

The transition of screens displayed on the television 901 in the case where the input of the television 901 has been manually switched during the period of time from when the reproduction of the DVD-RAM disc 111 starts to when its reproduction stops, is the same as the transition of screens in the case where the initial state is a state of viewing a television broadcast. In other words, the input of the television 901 will not be switched.

As described above, according to the third embodiment, it is possible to automatically switch the input of the television 901 to the screen which is displayed at the point in time when the reproduction by the DVD recorder 101 starts, when the output of the DVD recorder 101 returns to the EE screen, only in the case where such input has not been manually switched in the middle.

With this structure, in addition to achieving the effect provided by the first embodiment, even in the case where the reproduction by the DVD recorder 101 started or the menu screen was displayed, it is possible to ensure that the input of the television 901 will be automatically switched to the screen that was displayed before the start of the reproduction or the start of the menu display, when the output of the DVD recorder 101 returns to the EE screen.

Note that it is not necessary that values taken by the former screen information should exactly be the ones shown in FIG.

14. For example, the number of values may be either increased or decreased in type, depending on the number of external inputs to the television 901. In brief, any information may be used as long as it is possible to know the screen to which the input of the television 901 should be automatically switched at the time of receiving the "return to EE screen" command.

Note that the order of Step 1001, Step 1002 and Step 1003 in the flowchart of FIG. 15 may be interchanged, or these may be performed at the same time. Similarly, the order of Step 1008, Step 1009 and Step 1010 may be interchanged, or these may be performed at the same time.

Also note that although the operations to be performed in the case where the DVD recorder 101 reproduces the DVD-RAM disc 111 have been described as an example, the input of the television 901 automatically switches through the same operations as those described above, also in the case where the DVD recorder 101 displays the menu screen. The transition of screens in such case are the same as the transition of screens shown in FIG. 6 described in the first embodiment, and thus its description will not be given here.

Fourth Embodiment

The television according to the fourth embodiment of the present invention is capable of automatically switching the input to the former input and automatically displaying, for example, a specified menu screen at the same time, by storing more detailed former screen information. The following describes the fourth embodiment by focusing on the differences from the third embodiment. Note that the structures of the television and the DVD recorder in the fourth embodiment are the same as those of the above-described third embodiment (refer to FIG. 13), and thus their descriptions will not be given here.

(1) Operation of Television 901

The following describes an operation performed by the television 901 at the time of command reception. This operation is different from the operation of the television 901 of the third embodiment.

FIG. 19 is a diagram which shows an example of former screen information. To be more specific, the former screen information storage unit 912 stores values that indicate the screens that are displayed at the point in time when a "start output" command is received from the DVD recorder 101. The difference from the third embodiment is that not only the input of the switch 137, but also the type of the screen displayed by the television 901 is stored at the same time, in the case where the input of the switch 137 is the one from the tuner 136. For example, in the case where a menu screen for selecting an external device is displayed, "TV: device for viewing selection screen" is stored as the former screen information. When the user switches the input manually, the former screen information stored in the former screen information storage unit 912 is to be reset, as in the case of the third embodiment. Also in here, the former screen information which has been reset is represented as "none".

<Operation at Command Reception Time>

Upon receiving a command from the DVD recorder 101 through the command cable 123, the command input I/F 140 outputs such command to the control unit 911. In the case where the command received from the command input I/F 140 is a "start output" command, the control unit 911 instructs the switch 137 to switch the input to the data input I/F 139. At this time, the control unit 911 stores information indicating the former input of the switch 137 into the former screen information storage unit 912, as former screen information.

Furthermore, in the case where the former input of the switch 137 is the one from the tuner 136, the type of the screen displayed on the television 901 is to be stored at the same time. For example, when the screen of the television broadcast was displayed in the case where the former input of the switch 137 is the one from the tuner 136, "TV: TV broadcast" is to be stored, whereas when the screen for selecting a device for viewing, which is the menu screen of the television 901, was displayed, "TV: device for viewing selection screen" is to be stored, respectively as the former screen information.

Meanwhile, in the case where the command received from the command input I/F 140 is a "return to EE screen" command, the control unit 911 refers to the former screen information stored in the former screen information storage unit 912, and instructs the switch 137 to switch to the input indicated by the former screen information. Furthermore, in the case where the former screen information includes information indicating the type of the screen, the control unit 911 instructs the output processing unit 135 to display the menu screen indicated by the former screen information. When the value of the former screen information indicates "none", the control unit 911 will not instruct the switch 137 to switch the input.

(2) Operations of DVD Recorder 101 and Television 901

Figure 20:
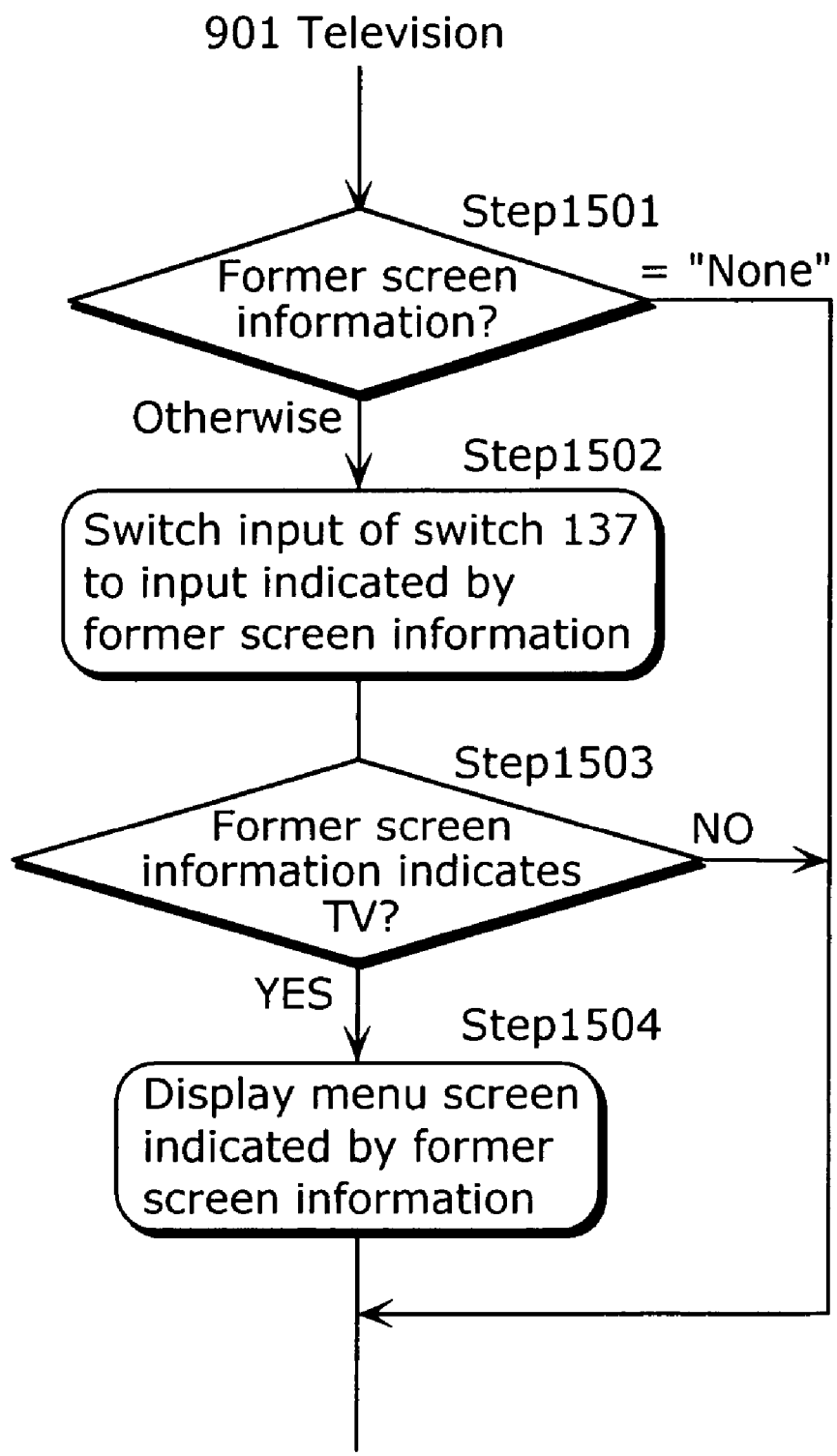
FIG. 20 is a flowchart of a television of the fourth embodiment.

FIG. 20 is a flowchart of the television 901 of the fourth embodiment. Here, only the operations corresponding to Step 1011 onward in the flowchart shown in FIG. 15 are illustrated. In other words, steps until Step 1010 in the flowchart shown in FIG. 15 are the same as those of the third embodiment, and thus they are not illustrated here.

Upon receiving the "return to EE screen" command, the television 901 checks the former screen information (Step 1501). In the case where the value of the former screen information indicates a value other than "none", the television 901 switches the input of the switch 137 to the one indicated by the former screen information (Step 1502). For example, in the case where the input of the switch 137 before the reproduction by the DVD recorder 101 starts is the one from the tuner 136, the input of the switch 137 is switched to the tuner 136, since the former screen information indicates "TV: XXX" (XXX indicates the details about the screen displayed by the television 901).

Furthermore, the television 901 checks whether or not the former screen information indicates "TV: XXX" (Step 1503). In the case where the former screen information indicates "TV: XXX", the television 901 displays the screen indicated by the former screen information. For example, in the case where the former screen information indicates "TV: XXX", the television broadcast received by the tuner 136 is to be displayed, whereas in the case where the former screen information indicates "TV: device for viewing selection screen", the screen for selecting an external device is to be displayed.

On the other hand, in the case where the former screen information is "none", the input of the switch 137 will not be switched. Furthermore, in the case where the former screen information is "DVR1", "game", and the like, the output from the external device indicated by the former screen information is to be directly displayed.

The following describes the transition of screens on the television 901 when it displays the menu screen in the state in which the input of the television 901 is set to the one from the tuner 136.

Figure 21:
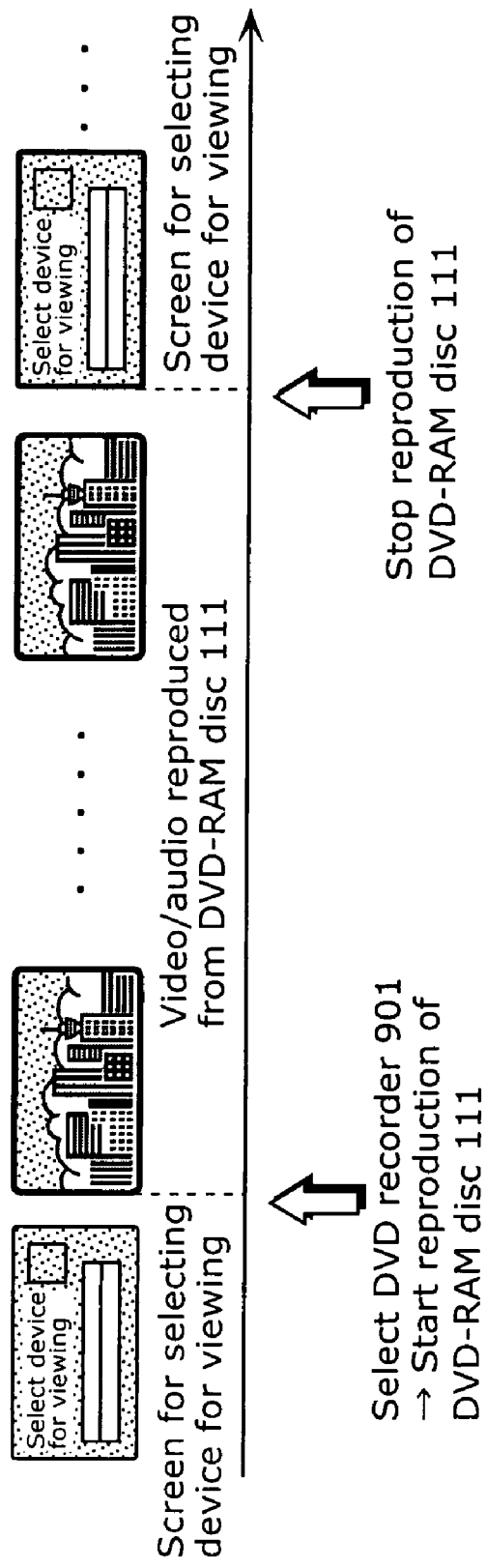
FIG. 21 is a diagram which shows the transition of screens displayed on the television in the fourth embodiment.

FIG. 21 is a diagram which shows the transition of screens displayed on the television 901. Here, it is assumed that the input of the television 901 has not been manually switched during the period of time from when the reproduction of the DVD-RAM disc 111 starts to when its reproduction stops.

To be more specific, when the reproduction by the DVD recorder 101 starts by selecting the DVD recorder 101 from the screen for selecting an external device, the input of the television 901 automatically switches to the DVD recorder 101, and the video reproduced from the DVD-RAM disc 111 is to be displayed. At this time, the former screen information is set to "TV: device for viewing selection screen". When the reproduction by the DVD recorder 101 stops, the input of the television 901 automatically switches to the tuner 136, since the value of the former screen information indicates "TV: device for viewing selection screen" (Step 1502). Furthermore, since the value of the former screen information indicates "TV: XXX", the menu screen for selecting an external device is to be automatically displayed on the television 901 as the menu screen indicated by "TV: device for viewing selection screen" (Step 1504).

Meanwhile, in the case where the input of the television 901 has been manually switched during the period of time from when the reproduction of the DVD-RAM disc 111 starts to when its reproduction stops, the transition of screens displayed on the television 901 is the same as the one described in the third embodiment. In other words, the input of the television 901 will not be switched.

As described above, according to the fourth embodiment, it is possible to automatically switch the input of the television 901 to the screen which is displayed at the point in time when the reproduction by the DVD recorder 101 starts and to automatically display the menu screen previously displayed on the television 901, when the output of the DVD recorder 101 returns to the EE screen, only in the case where such input has not been manually switched in the middle.

With this structure, in addition to achieving the effect provided by the third embodiment, it is possible to ensure that the screen returns to the former one when the reproduction by the DVD recorder 101 stops or when the display of the menu screen ends, even in the case where the screen displayed on the television 901 when the reproduction by the DVD recorder 101 starts or when the display of the menu screen starts was the menu screen of the television 901.

Note that it is not necessary that values taken by the former screen information should be exactly the ones shown in FIG. 19. For example, the number of values may be either increased or decreased in type, depending on the number of external inputs to the television 901. In brief, any information may be used as long as it is possible to know the following when the "return to EE screen" command is received: to which screen the input of the television 901 should be automatically switched; whether the screen should return to the television broadcast display; and which menu screen should be displayed.

Note that it is not only possible to embody the present invention as the above-described output control apparatus and reproduction apparatus, but also as an output control method and a reproduction method which include, as their respective steps, the characteristic units included in such output control apparatus and reproduction apparatus, as well as programs causing a computer to execute these steps. It should be also noted that such programs can be distributed on a recording medium such as a CD-ROM and via a transmission medium such as the Internet.

Note that the output processing unit 135 in the embodiments is one example of the output control unit in the present invention. The control units 134/611/911 in the embodiments are one example of the switching control unit in the present invention. The decoder 106 in the embodiments is one example of the reproduction unit in the present invention. The encoder 105 in the embodiments is one example of the conversion unit in the present invention. The disc management unit 104 in the embodiments is one example of the recording unit in the present invention. The menu screen in the embodiments is one example of the utility screen in the present invention.

Industrial Applicability

The output control apparatus according to the present invention is also applicable for use as a television, a VTR, and a DVR which are required to switch screens appropriately depending on situation.

The invention claimed is:

1. An output control apparatus that controls an output of video or audio, said output control apparatus comprising:
a tuner operable to receive a television broadcast;
a data input unit operable to receive the video or audio from a reproduction apparatus;
a command input unit operable to receive a command from the reproduction apparatus and operable to output an instruction based on the command received from the reproduction apparatus;
a selection unit operable to select between said tuner and said data input unit and operable to output the video or audio;
an output control unit operable to control the video or audio output from said selection unit; and
a switching control unit operable to receive the instruction from said command input unit, and operable to control said selection unit based on the instruction received from said command input unit,
wherein, upon receiving the instruction from said command input unit, said switching control unit controls said selection unit to select said tuner, when said selection unit is set to said data input unit and when the instruction indicates that the reproduction apparatus has entered a predetermined state, and
wherein, upon receiving the instruction from said command input unit, said switching control unit controls said selection unit to not select said tuner, when said selection unit is not set to said data input unit and when the instruction indicates that the reproduction apparatus has entered the predetermined state.

2. The output control apparatus according to claim 1, further comprising:
a user input init operable to receive an instruction from a user;
a flag storage unit operable to store a flag; and
a flag setting unit operable to set a value of the flag to one value of a plurality of values,
wherein, upon receiving the instruction from said command input unit indicating that the reproduction apparatus has entered the predetermined state, said flag setting unit is operable to (i) set the value of the flag to a first value of the plurality of values, when said selection unit is set to said tuner and (ii) set the value of the flag to a second value of the plurality of values, when said selection unit is set to an element other than said tuner,
wherein, upon receiving the instruction from said user input unit and based on the instruction received from said user input unit, said flag setting unit is operable to set the value of the flag to the second value, when said selection unit is set to an element other than said data input unit,
wherein, upon receiving the instruction from said command input unit indicating that the reproduction apparatus has entered the predetermined state, said switching control unit is operable to control said selection unit to select said tuner, when the value of the flag is the first value, and wherein, upon receiving the instruction from said command input unit indicating that the reproduction apparatus has entered the predetermined state, said switching control unit is operable to control said selection unit to not select said tuner, when the value of the flag is the second value.

3. The output control apparatus according to claim 1, further comprising:

a user input init operable to receive an instruction from a user;

a former screen information storage unit operable to store former screen information that includes information indicating a screen source from which a screen has been supplied; and a former screen information setting unit operable to set the former screen information, wherein said former screen information setting unit is operable to set, as the former screen information, a value indicating a screen source from which a screen outputted from said selection unit has been supplied, the screen being outputted from said selection unit when the instruction is received from said command input unit, wherein, based on the instruction received from said user input unit, said former screen information setting unit is operable to reset the former screen information, when said selection unit is set to an element other than said data input unit, wherein, upon receiving the instruction from said command input unit indicating that the reproduction apparatus has entered the predetermined state, said switching control unit is operable to control said selection unit to select the screen source indicated by the information included in the former screen information, when the former screen information is not in a reset state, and wherein, upon receiving the instruction from said command input unit indicating that the reproduction apparatus has entered the predetermined state, said switching control unit is operable not to control said selection unit, when the former screen information is in the reset state.

4. The output control apparatus according to claim 1, further comprising:

a user input init operable to receive an instruction from a user;

a former screen information storage unit operable to store former screen information including a value indicating a screen source from which a screen has been supplied and a value indicating a type of a utility screen; and a former screen information setting unit operable to set the former screen information, wherein said former screen information setting unit is operable to set, as the former screen information, (i) the value indicating the screen source from which a screen outputted from said selection unit has been supplied, the screen being outputted from said selection unit when the instruction is received from said command input unit, and (ii) the value indicating the type of utility screen being outputted by said output control unit, wherein, based on the instruction received from said user input unit, said former screen information setting unit is operable to reset the former screen information, when said selection unit is set to an element other than said data input unit, wherein, upon receiving the instruction from said command input unit, said switching control unit is operable to control said selection unit to select the screen source indicated by the former screen information, when the former screen information is not in a reset state, wherein, upon receiving the instruction from said command input unit indicating that the reproduction apparatus has entered the predetermined state, said switching control unit is operable not to control said selection unit, when the former screen information is in the reset state, and wherein said output control unit is operable to cause the utility screen indicated by the former screen information to be outputted, when said selection unit is set to the screen source indicated by the former screen information.

5. The output control apparatus according to claim 1, wherein said output control apparatus comprises a plurality of said data input units, and wherein said selection unit is operable to select one of said tuner or one of said plurality of said data input units.

6. The output control apparatus according to claim 1, wherein said switching control unit is operable to control said selection unit to select said data input unit, when a second instruction is received from said command input unit.

7. A reproduction apparatus that reproduces video or audio, said reproduction apparatus comprising:

a reproduction unit operable to reproduce the video or audio recorded in a recording medium;

a data output unit operable to output the reproduced video or audio to an output control apparatus; and a command output unit operable to output a first command to the output control apparatus when the output of the reproduced video or audio ends, the first command (i) indicating that a predetermined screen is returned to after said data output unit ends the output of the reproduced video or audio, and (ii) not instructing any specific operation for the output control apparatus.

8. The reproduction apparatus according to claim 7, further comprising a screen creation unit operable to create a utility screen, wherein said data output unit is operable to output the created utility screen to the output control apparatus, and wherein said command output unit is operable to output the first command to the output control apparatus, when said data output unit stops outputting the created utility screen to the output control apparatus.

9. The reproduction apparatus according to claim 7, wherein the first command indicates that predetermined data is being outputted to the output control apparatus.

10. The reproduction apparatus according to claim 7, further comprising a tuner that receives a television broadcast, wherein the first command indicates that the received television broadcast is being outputted to the output control apparatus.

11. The reproduction apparatus according to claim 9, further comprising:

a conversion unit operable to convert a received television broadcast into the video or audio in a predetermined format; and a recording unit operable to record the converted video or audio onto the recording medium.

12. The reproduction apparatus according to claim 7, wherein said command output unit is operable to output a second command to the output control apparatus, when said data output unit starts outputting the reproduced video or audio or when said data output unit starts an output of a created utility screen.

13. A television comprising:
a tuner operable to receive a television broadcast;
a plurality of inputs, each input of said plurality of inputs being operable to receive audio or video data from an external device;
a command input unit operable to receive a command from the external device and operable to output an instruction based on the command received from the external device;
a selection unit operable to select between said tuner and one input of said plurality of inputs and operable to output the audio or video data;
a switching control unit operable to receive the instruction from said command input unit, and operable to control said selection unit based on the instruction received from said command input unit; and
an output for outputting the audio or video data received from the external device connected to the one input of said plurality of inputs selected by said selection unit,
wherein (i), upon receiving the instruction from said command input unit when said command input unit receives a third command from a first external device and when said selection unit is set to said tuner, said selection unit is operable to switch from said tuner to a first input, of said plurality of inputs, connected to the first external device, and (ii) subsequent to (i), upon receiving the instruction from said command input unit when said command input unit receives a first command from the first external device indicating that the first external device has entered a predetermined state, said selection unit is operable to switch from said first input to said tuner, and
wherein (iii), upon receiving the instruction from said command input unit when said command input unit receives the third command from the first external device and when said selection unit is set to a second input, of said plurality of inputs, connected to a second external device, said selection unit is operable to switch from said second input to said first input, and subsequent to (iii), upon receiving the instruction from said command input unit when said command input unit receives the first command indicating that the first external device has entered the predetermined state, said selection unit is operable to switch from said first input to said second input.

14. The television according to claim 13, wherein the external device is an antenna, digital video recorder, or a home-use game machine.

15. The television according to claim 13, wherein the third command is transmitted from the first external device to said television, when the first external device begins reproduction of the audio or video data.

16. The television according to claim 13, wherein the first command is transmitted from the first external device to said television, when the first external device ends reproduction of the audio or video data.

17. The television according to claim 13, further comprising a flag setting unit operable to set a value of a flag, wherein the value of the flag is set to a first state, when the external device is an antenna, and the value of the flag is set to a second state, when the external device is not an antenna.

18. The television according to claim 17, wherein said switching control unit is operable to control said selection unit based on the value of the flag.

19. The television according to claim 13, further comprising a screen information unit operable to record screen information,
wherein the screen information includes information indicating that the external device is connected to an input of said plurality of inputs before said command input unit receives the third command, such that upon receiving the instruction from said command input unit when said command input unit receives the first command indicating that the external device has entered the predetermined state, said switching control unit controls said selection unit to select said input connected to the external device based on the screen information.

20. An output control system comprising:
a reproduction apparatus including:
a reproduction unit operable to reproduce video or audio data recorded on a recording medium;
a data output unit operable to output the reproduced video or audio data; and
a command sending unit operable to send a command; and
an output control apparatus including:
a tuner operable to receive a television broadcast;
a data input unit operable to receive the video or audio data output from said data output unit of said reproduction apparatus;
a command input unit operable to receive the command output from said command sending unit of said reproduction apparatus and operable to output an instruction based on the command received from said command sending unit;
a selection unit operable to select between said tuner and said data input unit and operable to output the video or audio data;
an output control unit operable to control the video or audio data output from said selection unit; and
a switching control unit operable to receive the instruction from said command input unit, and operable to control said selection unit based on the instruction received from said command input unit,
wherein, upon receiving the instruction from said command input unit, said switching control unit controls said selection unit to select said tuner, when said selection unit is set to said data input unit and when the instruction indicates that said reproduction apparatus has entered a predetermined state, and
wherein, upon receiving the instruction from said command input unit, said switching control unit controls said selection unit to not select said tuner, when said selection unit is not set to said data input unit and when the instruction indicates that the reproduction apparatus has entered the predetermined state.

21. The output control apparatus according to claim 1, wherein the predetermined state indicates a state in which reproduction by the reproduction apparatus has ended.

* * * * *

UNITED STATES PATENT AND TRADEMARK OFFICE
CERTIFICATE OF CORRECTION

| | | |
|---|---|---|
| PATENT NO. | : 8,072,548 B2 | |
| APPLICATION NO. | : 11/661500 | |
| DATED | : December 6, 2011 | |
| INVENTOR(S) | : Junji Yoshida et al. | |

It is certified that error appears in the above-identified patent and that said Letters Patent is hereby corrected as shown below:

(1) On the Front page, (86) PCT No.
"PCT/JP2006/013782" should be
--PCT/JP2006/313782--

(2) In Claim 2 (Column 22, line 46), Claim 3 (Column 23, line 12), and Claim 4 (Column 23, line 47)
"a user input init operable to..." should read
--a user input unit operable to...--

Signed and Sealed this
Twentieth Day of March, 2012

David J. Kappos
*Director of the United States Patent and Trademark Office*